(12) United States Patent
Nakamura et al.

(10) Patent No.: US 8,265,417 B2
(45) Date of Patent: Sep. 11, 2012

(54) IMAGE PROCESSING APPARATUS, METHOD, AND PROGRAM FOR ADDING SHADOW INFORMATION TO IMAGES

(75) Inventors: Yusuke Nakamura, Tokyo (JP); Shinichiro Gomi, Chiba (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 939 days.

(21) Appl. No.: 12/252,559

(22) Filed: Oct. 16, 2008

(65) Prior Publication Data

US 2009/0103831 A1    Apr. 23, 2009

(30) Foreign Application Priority Data

Oct. 17, 2007  (JP) .................................. 2007-269712

(51) Int. Cl.
*G06K 9/40*  (2006.01)
*H04N 9/74*  (2006.01)

(52) U.S. Cl. ....................................... 382/274; 348/586

(58) Field of Classification Search .................... 382/274
See application file for complete search history.

(56) References Cited

U.S. PATENT DOCUMENTS

| | | | | |
|---|---|---|---|---|
| 5,327,177 A | * | 7/1994 | DesJardins et al. | 348/586 |
| 5,737,031 A | * | 4/1998 | Tzidon et al. | 348/587 |
| 5,870,098 A | * | 2/1999 | Gardiner | 345/426 |
| 6,252,995 B1 | | 6/2001 | Takamori | |
| 6,285,798 B1 | | 9/2001 | Lee | |
| 6,349,113 B1 | * | 2/2002 | Mech et al. | 375/240.08 |
| 7,006,155 B1 | * | 2/2006 | Agarwala et al. | 348/592 |
| 7,733,343 B2 | * | 6/2010 | May | 345/426 |
| 2003/0151684 A1 | | 8/2003 | Shimazaki et al. | |
| 2004/0135739 A1 | * | 7/2004 | Fukushima et al. | 345/6 |
| 2005/0094890 A1 | | 5/2005 | Wang | |
| 2005/0212794 A1 | * | 9/2005 | Furukawa et al. | 345/419 |
| 2006/0170769 A1 | * | 8/2006 | Zhou | 348/143 |
| 2007/0036432 A1 | * | 2/2007 | Xu et al. | 382/173 |
| 2007/0147690 A1 | * | 6/2007 | Ishiwata | 382/232 |

FOREIGN PATENT DOCUMENTS

| | | |
|---|---|---|
| JP | 11-66299 | 3/1999 |
| JP | A HEI 11-203500 | 7/1999 |
| JP | 2002-056405 | 2/2002 |
| JP | A 2002-056405 | 2/2002 |
| JP | 2005-004468 | 1/2005 |
| JP | 2005-332130 | 12/2005 |

OTHER PUBLICATIONS

European Search Report dated Feb. 26, 2009.
Office Action from JPO, Application No. JP 2007-269712, dated Nov. 15, 2011.

* cited by examiner

*Primary Examiner* — David Zarka
(74) *Attorney, Agent, or Firm* — Finnegan, Henderson, Farabow, Garrett & Dunner, L.L.P.

(57) ABSTRACT

An image processing apparatus processes an input image while also considering the luminous intensity information thereof, and thereby generates an output image wherein the apparent object surface roughness has been enhanced with respect to the input image. The image processing apparatus includes a luminous intensity information separator that separates the input image information into global luminous intensity information and local luminous intensity information, a shadow component generator that generates a shadow component of the image on the basis of the local luminous intensity information, and an image compositor that generates an output image by adding shadow image information to the input image information, with the shadow image information being generated from the shadow component and from a value based on the input image information.

20 Claims, 21 Drawing Sheets

IMAGE PROCESSING APPARATUS, METHOD, AND PROGRAM FOR ADDING SHADOW INFORMATION TO IMAGES

CROSS REFERENCES TO RELATED APPLICATIONS

The present invention contains subject matter related to Japanese Patent Application JP 2007-269712 filed in the Japanese Patent Office on Oct. 17, 2007, the entire contents of which are incorporated herein by reference.

BACKGROUND OF THE INVENTION

1. Field of the Invention

The present invention relates to an image processing apparatus, an image processing method, and a program therefor. More particularly, the present invention relates to an image processing apparatus that conducts processing to enhance images, an image processing method for doing the same, and a program that causes a computer to execute the method.

2. Description of the Related Art

In the field of image processing, various image processing methods are used. Among these, there is a type of image enhancement processing referred to as unsharp masking, which is implemented in devices such as scanners used for proofing in the printing industry (cf. JP-A-H11-66299, FIG. 2).

SUMMARY OF THE INVENTION

In the technology of the related art, an image is treated simply as two-dimensional information, and thus no consideration is given for three-dimensional image creation processes. For this reason, there is a problem in that the processing yields unnatural results. In particular, local contrast is raised for an input image without considering object surface roughness information with respect to the input image. Furthermore, since the luminous intensity information of the input image is not taken into consideration, there is a problem in that the resulting image loses overall perspective.

Consequently, it is desirable to provide an image processing apparatus that processes an input image, including the luminous intensity information thereof, and generates an output image wherein the apparent object surface roughness has been enhanced with respect to the input image, thereby reproducing texture different from that obtained by the enhancement processing of the related art.

The present invention, being devised in light of the above problems, provides an image processing apparatus, an image processing method, and a program that causes a computer to execute the method, wherein an input image is processed while also considering the luminous intensity information thereof, thereby generating an output image wherein the apparent object surface roughness has been enhanced with respect to the input image.

A first embodiment of the present invention is provided with: luminous intensity information separating means for separating the input image information of an input image into global luminous intensity information and local luminous intensity information; shadow component generating means for generating a shadow component of the image on the basis of the local luminous intensity information; and image compositing means for generating output image information by adding shadow image information to the input image information, with the shadow image information being generated from the shadow component and from a value based on the input image information.

In addition, in the first embodiment, the shadow component generating means may be configured to include: normal vector computing means for computing a normal vector with respect to an object surface in the input image from the luminous intensity gradient of the local luminous intensity information; light vector computing means for computing a light vector indicating the direction of a light source on the basis of the local luminous intensity information; and normalized inner product processing means for computing the shadow component on the basis of the normalized inner product between the normal vector and the light vector. In so doing, a shadow component that enhances the apparent object surface roughness is computed by conducting processing to compute the normalized inner product of a normal vector and a light vector.

In addition, the first embodiment may be configured to further include band separating means for generating a plurality of local, per-band luminous intensity information by band-separating the local luminous intensity information, while additionally, the shadow component generating means may also be configured to generate the shadow component on the basis of the per-band luminous intensity information. In so doing, a shadow component that enhances the apparent object surface roughness is computed on the basis of per-band luminous intensity information.

In addition, the first embodiment may be configured to further include control signal generating means for generating, on the basis of the input image information, a shadow addition control signal for controlling the intensity of the shadow component, while additionally, the image compositing means may be configured to also use the shadow addition control signal when generating the shadow image information. In so doing, a shadow component that enhances the apparent object surface roughness is computed using a shadow addition control signal.

In addition, in the first embodiment, the control signal generating means may be configured to include: edge rims intensity computing means for generating, on the basis of the input image information, an edge rims intensity value for use in conducting a control to suppress the intensity of edge rims in the shadow component; and gradient reliability computing means for computing, on the basis of the input image information, a gradient reliability value for use in conducting a control to suppress the intensity of portions of low contrast in the shadow component. In so doing, a shadow addition control signal is computed on the basis of an edge rims intensity value and a gradient reliability value.

In addition, in the first embodiment, the light vector computing means may be configured to compute, on the basis of the local luminous intensity information, the direction of maximum luminous intensity gradient in the vicinity of a focus pixel, and then compute a light vector with respect to the focus pixel by subjecting the direction of maximum luminous intensity gradient to angle conversion. In so doing, a light vector is computed such that a shadow component is computed that accurately enhances the apparent object surface roughness.

In addition, in the first embodiment, the light vector computing means may be configured to compute, on the basis of the local luminous intensity information, the direction of maximum luminous intensity gradient in the vicinity of a focus pixel, and then compute a light vector with respect to the focus pixel by subjecting the direction of maximum luminous intensity gradient to vector conversion. In so doing, a light vector is computed such that a shadow component is computed that accurately enhances the apparent object surface roughness.

In addition, in the first embodiment, the light vector computing means may also be configured to compute a light vector for a focus pixel by subjecting the azimuthal angle of the normal vector to angle conversion. In so doing, a light vector is computed such that a shadow component is computed that accurately enhances the apparent object surface roughness.

In addition, in the first embodiment, the light vector computing means may also be configured to compute a light vector for a focus pixel by subjecting the azimuthal component of the normal vector to vector conversion. In so doing, a light vector is computed such that a shadow component is computed that accurately enhances the apparent object surface roughness.

In addition, in the first embodiment, the light vector computing means may also be configured to compute, on the basis of a plurality of light vector candidates and the normal vector, a contrast candidate value for the shadow component with respect to each pixel in the input image. The light vector computing means then selects a light vector from among the plurality of light vector candidates whereby the largest number of pixels obtains the maximum contrast candidate value. The selected light vector is then taken to be a common light vector for all pixels. In so doing, a light vector is computed such that a shadow component is computed that accurately enhances the apparent object surface roughness.

In addition, in the first embodiment, the light vector computing means may also be configured to take a plurality of light vector candidates and compute, with respect to each light vector candidate, an average contrast candidate value for the shadow component within a specified area in the vicinity of a focus pixel. The light vector computing means then combines the plurality of light vector candidates on the basis of the ratio of the average values to thereby compute the light vector with respect to the focus pixel. In so doing, a light vector is computed such that a shadow component is computed that accurately enhances the apparent object surface roughness.

In addition, in the first embodiment, the image compositing means may also be configured to generate shadow image information from the shadow component, from a value based on the global luminous intensity information, and from the shadow addition control signal. In so doing, a shadow component is added such that the apparent object surface roughness is accurately enhanced.

In addition, in the first embodiment, the image compositing means may also be configured to combine information using a predetermined value, wherein the combining is conducted when a value based on the input image information is greater than the predetermined value. In so doing, a shadow component is added such that the apparent object surface roughness is accurately enhanced.

In addition, in the first embodiment, the image compositing means may also be configured to combine information using a predetermined value, wherein the combining is conducted when the value of the shadow image information is less than the predetermined value. In so doing, a shadow component is added such that the apparent object surface roughness is accurately enhanced.

In addition, in the first embodiment, the luminous intensity information separating means may also be configured such that the local luminous intensity information is taken to be information wherein the difference between the input information and a signal of the input information that has passed through a low-pass filter (i.e., the high-frequency components of the input image information) has been suppressed. Furthermore, the global luminous intensity information is taken to be the difference between the input image information and the local luminous intensity information. In so doing, input image information is effectively band-separated.

In addition, in the first embodiment, the luminous intensity information separating means may also be configured to include a plurality of low-pass filters having different passbands. Furthermore, a plurality of low-frequency components are obtained whose respective high-frequency components (i.e., the components resulting from the respective differences between the input image information and one among the plurality of signals of the input image information that has passed through one among the plurality of low-pass filters) have been suppressed. This plurality of low-frequency components is then mixed to form the local luminous intensity information, while the global luminous intensity information is taken to be the difference between the input image information and the local luminous intensity information. In so doing, input image information is effectively band-separated.

In addition, a second embodiment of the present invention is provided with: luminous intensity information separating means for separating the input image information of an input image into global luminous intensity information and local luminous intensity information; band separating means for generating a plurality of local, per-band luminous intensity information by band-separating the local luminous intensity information; shadow component generating means for generating a shadow component of the image on the basis of the plurality of local, per-band luminous intensity information; control signal generating means for generating, on the basis of the input image information, a shadow addition control signal for controlling portions where the shadow component is to be suppressed; and image compositing means for generating output image information by adding shadow image information to the input image information, with the shadow image information being generated from the shadow component, from a value based on the input image information, and from the shadow addition control signal. In so doing, an input image, including the luminous intensity information thereof, is processed to thereby generate an output image wherein the apparent object surface roughness has been enhanced with respect to the input image.

According to the present invention, image processing is conducted while taking roughness information and light source information of the input image into consideration. For this reason, excellent advantages are achieved, including the expression of object surface roughness and texture that is not expressed by using the enhancement processing of the related art.

DESCRIPTION OF THE PREFERRED EMBODIMENTS

Hereinafter, embodiments of the present invention will be described with reference to the accompanying drawings.

A first embodiment of the present invention will now be described with reference to the accompanying drawings.

Figure 1:
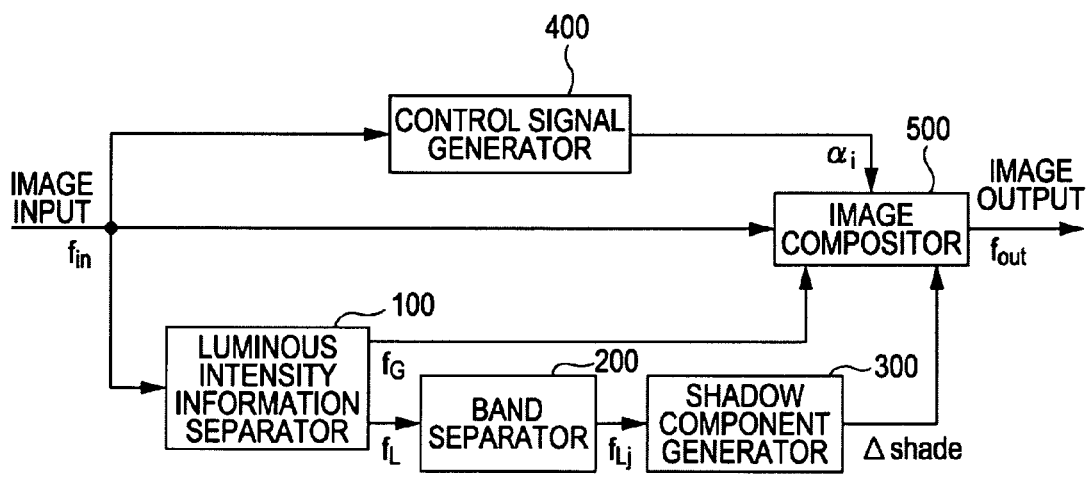
FIG. 1 is a diagram illustrating an exemplary functional configuration of an image processing apparatus realizing an embodiment of the present invention.

FIG. 1 is a diagram illustrating an exemplary functional configuration of an image processing apparatus for realizing an embodiment of the present invention.

Herein, the image processing apparatus is assumed to include a luminous intensity information separator 100, a band separator 200, a shadow component generator 300, a control signal generator 400, and an image compositor 500.

The luminous intensity information separator 100 separates the input image information $f_{in}$ of an input image into a component to be enhanced (being primarily small-amplitude components) and a residual component. Expressed in three-dimensional terms, the above separation involves the following. Given a grayscale image, if it is assumed that the bright portions thereof are nearby and the dark portions thereof are more distant, then it is possible to extract roughness information from the image by using the luminous intensity information as a substitute for height information. In order to extract detailed object surface roughness from an input image, the present invention is configured to separate an input image into global luminous intensity information $f_G$ (i.e., the lighting component of the image) and local luminous intensity information $f_L$ (i.e., the detailed object surface roughness information component). The luminous intensity information separator 100 then supplies the separated global luminous intensity information $f_G$ to the image compositor 500, while supplying the separated local luminous intensity information $f_L$ to the band separator 200.

In order to individually control the frequency bands to be enhanced, the band separator 200 separates the local luminous intensity information $f_L$ supplied from the luminous intensity information separator 100 into a number of bands j (j being an integer equal to or greater than 2), thereby generating a plurality of local, per-band luminous intensity information $f_{Lj}$. In so doing, it is possible to freely express a range of object surface roughness from the small scale to the large scale. The band separator 200 then supplies the band-separated plurality of local, per-band luminous intensity information $f_{Lj}$ to the shadow component generator 300.

The shadow component generator 300 generates a shadow component Δshade for enhancing the input image information $f_{in}$ on the basis of the per-band luminous intensity information $f_{Lj}$ supplied from the band separator 200. The band separator 200 then supplies the generated shadow component Δshade to the image compositor 500.

On the basis of the input image information $f_{in}$, the control signal generator 400 generates a shadow addition control signal $\alpha_i$ for controlling the intensity of the shadow component. The shadow addition control signal $\alpha_i$ is a signal for complementing the separation ability of the luminous intensity information separator 100, and is used to suppress the intensity of various noise elements, such as edge rims or low-contrast portions not included in the original shadow component. The control signal generator 400 then supplies the generated shadow addition control signal $\alpha_i$ to the image compositor 500.

The image compositor 500 generates shadow image information from the shadow component Δshade supplied from the shadow component generator 300, the global luminous intensity information $f_G$ supplied from the luminous intensity information separator 100, and the shadow addition control signal $\alpha_i$ supplied from the control signal generator 400. The image compositor 500 subsequently adds the shadow image information to the input image information $f_{in}$ to form output image information $f_{out}$, and then outputs the resulting output image information $f_{out}$.

Figure 2:
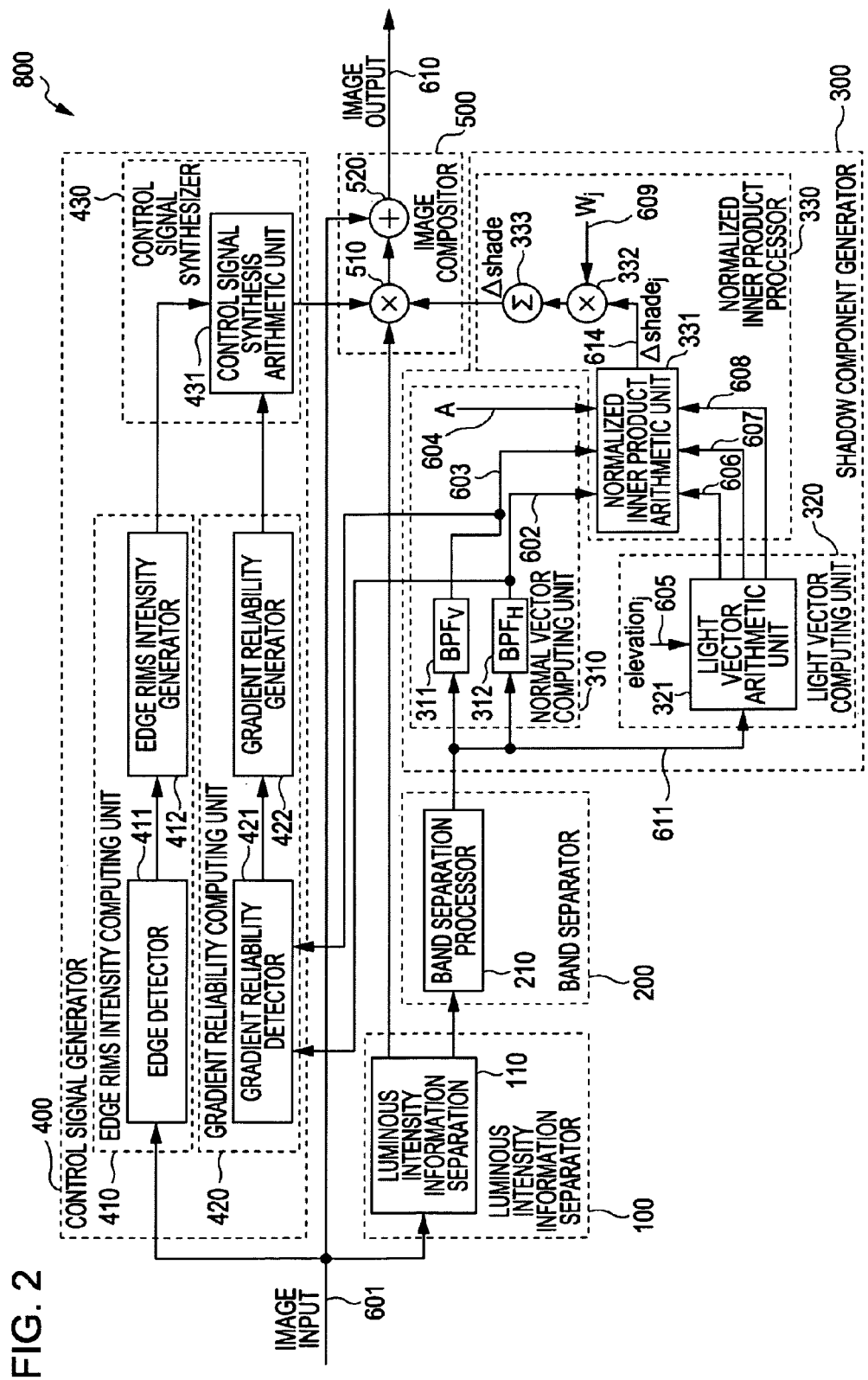
FIG. 2 is a diagram illustrating an exemplary configuration of an image processing apparatus 800 in accordance with a first embodiment of the present invention.
Figure 3A:
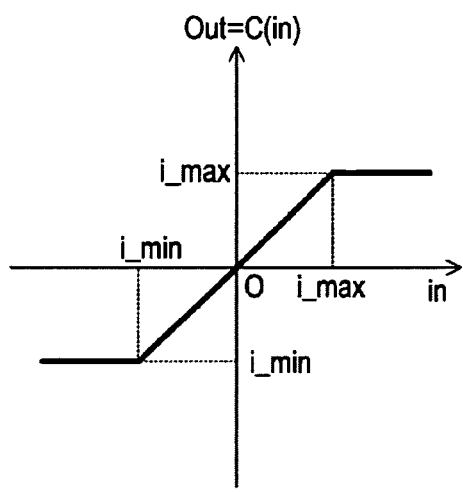
FIG. 3A is a diagram illustrating an example of a function C used by a luminous intensity information separation processor 110 in accordance with a first embodiment of the present invention.
Figure 3B:
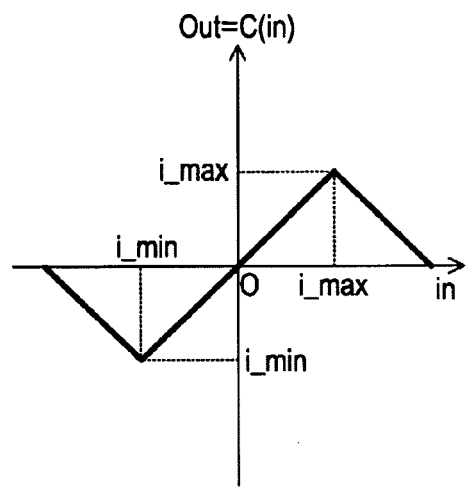
FIG. 3B is a diagram illustrating an example of a function C used by a luminous intensity information separation processor 110 in accordance with a first embodiment of the present invention.
Figure 3C:
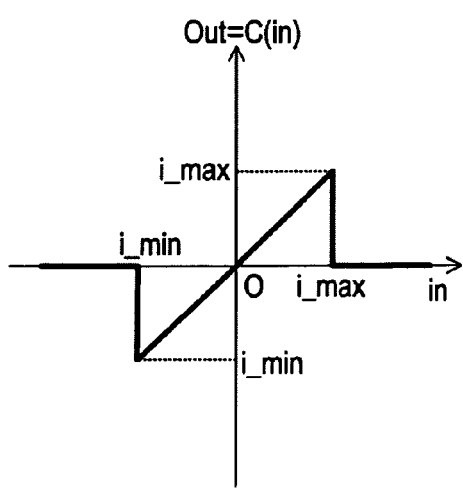
FIG. 3C is a diagram illustrating an example of a function C used by a luminous intensity information separation processor 110 in accordance with a first embodiment of the present invention.
Figure 3D:
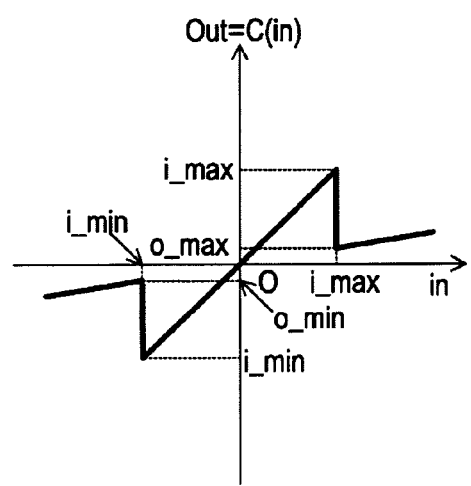
FIG. 3D is a diagram illustrating an example of a function C used by a luminous intensity information separation processor 110 in accordance with a first embodiment of the present invention.

FIG. 2 is a diagram illustrating an exemplary configuration of an image processing apparatus 800, herein described as an example of the first embodiment of the present invention.

As shown in FIG. 2, the image processing apparatus 800 is provided with a luminous intensity information separator 100, a band separator 200, a shadow component generator 300, a control signal generator 400, and an image compositor 500.

The luminous intensity information separator 100 is provided with a luminous intensity information separation processor 110. The luminous intensity information separation processor 110 separates the input image information $f_{in}$ of an input image into global luminous intensity information $f_G$ and local luminous intensity information $f_L$. The separation method may involve applying a low-pass filter (hereinafter abbreviated as LPF) to the input image information $f'_G$ to thereby create $f'_G$ (cf. Eq. 1), and then taking the local luminous intensity information $f_L$ to be only the low-amplitude component resulting from the difference between $f_{in}$ and $f'_G$. In this case, strong edges become included in the local luminous intensity information $f_L$ upon applying a simple LPF to portions having strong edges. For this reason, the local luminous intensity information $f_L$ is computed using a function C shown in FIG. 3, to be hereinafter described (cf. Eq. 2). In so doing, a signal with low amplitudes only is extracted, while the high-amplitude component is suppressed. Next, the differential signal between the input image information $f_{in}$ and the local luminous intensity information $f_L$ is computed as the global luminous intensity information $f_G$ (cf. Eq. 3).

$$f'_G = lpf \otimes f_{in} \quad (1)$$

$$f_L = C(f_{in} - f'_G) \quad (2)$$

$$f_G = f_{in} - f_L \quad (3)$$

Another separation method different from the above involves preparing three filters $LPF_S$, $LPF_M$, and $LPF_L$ each having a different frequency passband, and then applying the three filters $LPF_j$ to the input image information $f_{in}$ to thereby create $f'_{GS}$, $f'_{GM}$, and $f'_{GL}$ (cf. Eq. 4). The differences between $f_{in}$ and $f'_{Gj}$ (j=S, M, L) are then respectively multiplied by the function C to compute $f_{LS}$, $f_{LM}$, and $f_{LL}$ (cf. Eq. 5). Additionally, another method exists wherein the three filter results $f_{Lj}$ (j=S, M, L) are mixed to form the local luminous intensity information $f_L$ (cf. Eq. 6). Herein, S, M, and L represent LPF tap numbers, with the above order indicating successively narrower bands. In addition, the blend ratios (M and as have the characteristics shown in FIG. 4, to be hereinafter described. Similarly to the previous method, the differential signal between the input image information $f_{in}$ and the local luminous intensity information $f_L$, is then computed as the global luminous intensity information $f_G$ (cf. Eq. 7).

$$f'_{Gj} = lpf_j \otimes f_{in} (j=S,M,L) \quad (4)$$

$$f_{Lj} = C(f_{in} - f'_{Gj})(j=S,M,L) \quad (5)$$

$$f_L = \alpha_S \times f_{LS} + (1-\alpha_S) \times (\alpha_M \times f_{LM} + (1-\alpha_M) \times f_{LL}) \quad (6)$$

$$f_G = f_{in} - f_L \quad (7)$$

The mixing mentioned above will now be described. First, a contrast intensity $\alpha_C$ is referenced, this value being computed by an edge rims intensity computing unit 410 to be hereinafter described. The method is designed such that if the contrast intensity $\alpha_C$ is strong, then the results obtained using the wide-band LPF (j=S) are used. If the contrast intensity $\alpha_C$ is weak, then the results obtained using the narrow-band LPF (j=L) are used. If the contrast intensity $\alpha_C$ is an intermediate value, then the results obtained using an LPF (j=M) that passes frequencies up to a frequency existing somewhere between the passbands of the above filters are used. In so doing, strong edges are not obscured when such edges are present (i.e., the local luminous intensity information $f_L$ is set such that edges are mostly not included), while weak edges are aggressively obscured (i.e., the local luminous intensity information $f_L$ is set so as to obtain a relatively large degree of roughness).

The band separator 200 is provided with a band separation processor 210. The band separation processor 210 band-separates the local luminous intensity information $f_L$ supplied from the luminous intensity information separation processor 110 into three bands in order to separately control the frequency bands to be enhanced. Herein, algorithms indicated by Eqs. 14 to 17 are used as the band separation filters for separating the local luminous intensity information $f_L$ into three bands, thereby separating the local luminous intensity information $f_L$ into three bands for each x component and y component thereof (cf. Eqs. 8 to 13 and FIG. 5).

$$f_{L0x} = hlpf \otimes f_L \quad (8)$$

$$f_{L2x} = hhpf \otimes f_L \quad (9)$$

-continued $$f_{L1x} = f_L - (f_{L0x} + f_{L2x}) \quad (10)$$

$$f_{L0y} = vlpf \otimes f_L \quad (11)$$

$$f_{L2y} = vhpf \otimes f_L \quad (12)$$

$$f_{L1y} = f_L - (f_{L0y} + f_{L2y}) \quad (13)$$

$$hlpf = (1\ 2\ 1) \otimes (1\ 2\ 1) \quad (14)$$

$$hhpf = (1\ -2\ 1) \otimes (1\ -2\ 1) \quad (15)$$

$$vlpf = \begin{pmatrix} 1 \\ 2 \\ 1 \end{pmatrix} \otimes \begin{pmatrix} 1 \\ 2 \\ 1 \end{pmatrix} \quad (16)$$

$$vhpf = \begin{pmatrix} 1 \\ -2 \\ 1 \end{pmatrix} \otimes \begin{pmatrix} 1 \\ -2 \\ 1 \end{pmatrix} \quad (17)$$

In this way, the band separation processor 210 band-separates the local luminous intensity information $f_L$ by means of the above Eqs. 8 to 17, thereby generating the band-separated, per-band luminous intensity information $f_{Lj}$ (j=0, 1, 2 (hereinafter omitted)) indicated by Eq. 18. Subsequently, the per-band luminous intensity information $f_{Lj}$ thus generated by the band separation processor 210 is supplied to a $BPF_V$ unit 311, a $BPF_H$ unit 312, and a light vector arithmetic unit 321, to be hereinafter described.

$$\begin{pmatrix} f_{L0} \\ f_{L1} \\ f_{L2} \end{pmatrix} = \begin{pmatrix} 0.5 \times (f_{L0x} + f_{L0y}) \\ 0.5 \times (f_{L1x} + f_{L1y}) \\ 0.5 \times (f_{L2x} + f_{L2y}) \end{pmatrix} \quad (18)$$

The shadow component generator 300 is provided with a normal vector computing unit 310, a light vector computing unit 320, and a normalized inner product processor 330.

The normal vector computing unit 310 computes normal vectors with respect to an object surface in an image. A normal vector is a vector indicating the luminous intensity gradient of the luminous intensity information used as a substitute for height information. In other words, the normal vector indicates the plane normal to an object surface (cf. FIG. 6). Consequently, normal vectors are computed as the output from horizontal and vertical differential filters applied to the per-band luminous intensity information $f_{Lj}$.

The normal vector computing unit 310 is provided with a vertical differential filter (hereinafter abbreviated $BPF_V$ (vertical band-pass filter)) 311 and a horizontal differential filter (hereinafter abbreviated $BPF_H$ (horizontal band-pass filter)) 312.

The $BPF_H$ 312 is a filter that computes the x components $n_{xj}$ of per-band normal vectors from the per-band luminous intensity information $f_{Lj}$ (cf. Eqs. 19 and 20). The $BPF_H$ 312 then supplies the computed x components $n_{xj}$ of the per-band normal vectors to a normalized inner product arithmetic unit 331 via a signal line 602.

The $BPF_V$ 311 is a filter that computes the y components $n_{yj}$ of per-band normal vectors from the per-band luminous intensity information $f_{Lj}$ (cf. Eqs. 19 and 21). The $BPF_V$ 311 then supplies the computed y components $n_{yj}$ of the per-band normal vectors to the normalized inner product arithmetic unit 331 via a signal line 603.

$$\begin{pmatrix} n_{xj} \\ n_{yj} \\ n_{xj} \end{pmatrix} = \begin{pmatrix} hbpf \otimes f_j \\ vbpf \otimes f_j \\ A \end{pmatrix} \quad j = 0, 1, 2 \quad (19)$$

$$hbpf = \begin{pmatrix} 1 & 0 & -1 \\ 1 & 0 & -1 \\ 1 & 0 & -1 \end{pmatrix} \quad (20)$$

$$vbpf = \begin{pmatrix} -1 & -1 & -1 \\ 0 & 0 & 0 \\ 1 & 1 & 1 \end{pmatrix} \quad (21)$$

It should be appreciated that the above filters for computing normal vectors may also use smaller operators when it is desirable to modify the above band separation methods and extract more detailed roughness information. Furthermore, noise coring may also be applied to a texture image in order to strengthen noise resistance prior to computing the normal vectors. Herein, an arbitrary, fixed constant A is used throughout the entire image for the z components of the per-band normal vectors. The z components $n_z$ are then supplied to the normalized inner product arithmetic unit 331 via a signal line 604.

The light vector computing unit 320 computes light vectors indicating the direction of the light source on the basis of the per-band luminous intensity information $f_{Lj}$ described above. The light vectors are used as directional parameters for computing the shadow component Δshade used to enhance the input image information $f_{in}$. A light vector is able to express two parameters, azimuth and elevation (cf. FIG. 7). There exist two potential methods whereby the azimuth and the elevation can be set, with one method involving the application of the parameters as external variables, and the other method involving the determination of the light source direction from the input image information. In the former method, fixed values are simply applied externally. In the latter method, a variety of variations may be considered according to how shadows are to be applied.

Given a normal vector n and a light vector l, the shadow obtaining therebetween is expressed by the normalized inner product of the vector n and the vector l, as shown in Eq. 22.

$$\text{shade} = \frac{\bar{n} \cdot \bar{l}}{|\bar{n}||\bar{l}|} \bigg/ l_Z = \frac{\bar{n} \cdot \bar{l}}{|\bar{n}| l_Z} \quad (22)$$

On the other hand, if the light source is assumed to be located at an azimuth θ and an elevation φ, then the light vector may be expressed as shown in Eq. 23 below (cf. FIG. 7).

$$\begin{pmatrix} l_x \\ l_y \\ l_z \end{pmatrix} = \begin{pmatrix} \cos\theta\cos\phi \\ \sin\theta\cos\phi \\ \sin\phi \end{pmatrix} \quad (23)$$

Furthermore, per-band light vectors can be defined for each band, as shown in Eq. 24 below.

$$\begin{pmatrix} l_{xj} \\ l_{yj} \\ l_{zj} \end{pmatrix} = \begin{pmatrix} \cos\theta_j \cos\phi_j \\ \sin\theta_j \cos\phi_j \\ \sin\phi_j \end{pmatrix} \quad j = 0, 1, 2 \quad (24)$$

The light vector computing unit 320 is provided with a light vector arithmetic unit 321. The light vector arithmetic unit 321 uses per-band luminous intensity information $f_{Lj}$ input from a signal line 611 to compute per-band light vectors $l_j$. The light vector arithmetic unit 321 then supplies the per-band light vectors $l_j$ to the normalized inner product arithmetic unit 331 via signal lines 606 to 608. The configuration of the light vector arithmetic unit 321 will be later described in detail with the use of FIG. 8.

As shown by Eq. 22 above, it can be seen that if the light source is taken to be in the direction of the luminous intensity gradient, then the shadow value (shade) reaches a maximum at the focal point. At this point, if one light source direction is assumed for a given set of roughness information, then the contrast $C_p(\theta)$ of the shadow component defined in Eq. 25 returns a high value.

$$C_P(\theta) = \nabla \left| \vec{n} \cdot \vec{l}(\theta) \right| = \sqrt{\left(\frac{d\vec{n} \cdot \vec{l}(\theta)}{dx}\right)^2 + \left(\frac{d\vec{n} \cdot \vec{l}(\theta)}{dy}\right)^2} \quad (25)$$

The normalized inner product processor 330 computes a shadow component on the basis of the normalized inner product of the normal vectors and the light vectors described above. Expressed in three-dimensional terms, the shadow component is computed by applying light source information to roughness information. The normalized inner product processor 330 is provided with a normalized inner product arithmetic unit 331, a multiplier 332, and a summer 333.

The normalized inner product arithmetic unit 331 generates per-band shadow components $\Delta\text{shade}_j$ using the per-band normal vectors $n_j$ supplied from the normal vector computing unit 310 via the signal lines 602 to 604 and the per-band light vectors $l_j$ received as input from the light vector arithmetic unit 321 via the signal lines 606 to 608. The normalized inner product arithmetic unit 331 then supplies the shadow components $\Delta\text{shade}_j$ to the multiplier 332 via a signal line 614 (cf. Eq. 27). The configuration of the normalized inner product arithmetic unit 331 will be later described in detail using the use of FIG. 11.

The multiplier 332 multiplies $\Delta\text{shade}_j$ by per-band weight values $w_j$ received as input via a signal line 609. The above values are supplied from the normalized inner product arithmetic unit 331.

The summer 333 sums the respective products of the weight values $w_j$ and $\Delta\text{shade}_j$ that were supplied from the normalized inner product arithmetic unit 331, thereby computing the shadow component $\Delta\text{shade}$ (cf. Eq. 27). The summer 333 then supplies the computed shadow component $\Delta\text{shade}$ to an image multiplier 510.

$$\Delta \text{shade} = \sum_j w_j \Delta \text{shade}_j \quad (26)$$

$$\Delta \text{shade}_j = \frac{\vec{n}_j \cdot \vec{l}_j}{|n_j| l_z} - 1 \quad (27)$$

Bump mapping applied to a two-dimensional image with respect to Eq. 27 will now be described. Since a two-dimensional image is planar, the corresponding normalized normal vector $N_0$ takes the values shown in Eq. 28. If specular reflection is discounted from consideration and a lambert surface (i.e., a perfectly scattering surface) is assumed as the reflection model, then the luminous intensity I before processing may be expressed in terms of the brightness L of the light source, a specular reflection coefficient $g_d$, the normal vector $N_0$, and the light vector l (cf. Eq. 29). A lambert surface refers to a perfectly scattering surface having properties such that the intensity of light incident from a given direction onto an arbitrary small surface area, and then emitted therefrom, is proportional to the cosine of the angle formed between the incident vector and the normal vector with respect to the incident surface. The brightness of this surface is thus constant, regardless of viewing angle.

In addition, the luminous intensity I' after processing may be similarly expressed in terms of the brightness L of the light source, a specular reflection coefficient $g_d$, a normal vector N, and the light vector l (cf. Eq. 33). Herein, if all vectors are taken to be normalized and only the normal vector is varied, then Eqs. 30 to 32 are obtained, wherein D is a vector expressing the variation of the normal vector.

If the above relationship is used to modify Eq. 33, then the relationship expressed in Eq. 35 is obtained, due to the fact that the inner product between the normal vector $N_0$ and the light vector l is $l_z$ (cf. Eq. 34). Herein, the inner product between the normal vector N and the light vector l is divided by $l_z$ and set as the value shade.

As a result, since lz exists in the denominator of Eq. 27, and since (shade−1) is equal to $\Delta$shade, the quantity (−1) is added to Eq. 35.

$$\vec{N}_0 = (0, 0, 1) \quad (28)$$

$$I = L g_d \vec{N}_0 \cdot \vec{l} \quad (29)$$

$$\vec{n} = (n_x, n_y, n_z) \quad (30)$$

$$\vec{N} = \frac{\vec{n}}{|\vec{n}|} = (N_x, N_y, N_z) \quad (31)$$

$$\vec{D} = \vec{N} - \vec{N}_0 = (N_x, N_y, N_z - 1) \quad (32)$$

$$I' = L g_d \vec{N} \cdot \vec{l} \quad (33)$$

$$= L g_d (\vec{N}_0 + \vec{D}) \cdot \vec{l}$$

$$= L g_d \vec{N}_0 \cdot \vec{l} + L g_d (N_x, N_y, N_z - 1) \cdot (l_x, l_y, l_z)$$

$$= L g_d \vec{N}_0 \cdot \vec{l} + L g_d (\vec{N} \cdot \vec{l} - l_z)$$

$$= L g_d \vec{N}_0 \cdot \vec{l} + L g_d l_z (\vec{N} \cdot \vec{l} / l_z - 1)$$

$$\vec{N}_0 = \vec{l} = (0, 0, 1) \cdot (l_x, l_y, l_z) = l_z \quad (34)$$

$$I' = I + I(\text{shade} - 1) \quad (35)$$

Typically, if the weight values $w_j$ are used to excessively apply the low frequencies of the shadow component, then the texture appears highly linked, while if the weight values $w_j$ are used to excessively apply the high frequencies of the shadow component, noise becomes more apparent. In light of this problem, a combination of weights is used to more effectively apply the shadow component. For example, if the local luminous intensity information $f_L$ is band-separated into 3 bands by the band separation processor 210, then a set of weight values with the ratio $w_0:w_1:w_2=1:4:2$ may be used.

The control signal generator 400 is provided with an edge rims intensity computing unit 410, a gradient reliability computing unit 420, and a control signal synthesizer 430.

The edge rims intensity computing unit 410 extracts edges of the image from the input image information $f_{in}$, computes an edge rims intensity value $\alpha_0$, and then supplies the edge rims intensity $\alpha_0$ to the control signal synthesizer 430, to be hereinafter described. The edge rims intensity computing unit 410 includes an edge detector 411 and an edge rims intensity generator 412.

The edge detector 411 detects a contrast intensity $\alpha_C$ and an edge intensity $\alpha_E$ from the input image information $f_{in}$, and then supplies $\alpha_C$ and $\alpha_E$ to the edge rims intensity generator 412. More specifically, the contrast intensity $\alpha_C$ is computed using an eigenvalue $\lambda 1$, while the edge intensity $\alpha_E$ is computed using an eigenvalue ratio $(\lambda 1/\lambda 1)$, to be hereinafter described with reference to FIG. 12. The eigenvalues $\lambda 1$ and $\lambda 2$ will be hereinafter described with reference to FIG. 9.

The edge rims intensity generator 412 uses the contrast intensity $\alpha_C$ and the edge intensity $\alpha_E$ supplied from the edge detector 411 to compute an edge rims intensity value $\alpha_0$ according to Eq. 36. The edge rims intensity generator 412 then supplies the computed edge rims intensity $\alpha_0$ to a control signal synthesis arithmetic unit 431 to be hereinafter described.

$$\alpha_0 = \alpha_C \times \alpha_E \quad (36)$$

The gradient reliability computing unit 420 computes a gradient reliability value $\alpha_R$, and then supplies $\alpha_R$ to the control signal synthesizer 430 to be hereinafter described.

The gradient reliability computing unit 420 includes a gradient reliability detector 421 and a gradient reliability generator 422.

The gradient reliability detector 421 detects normal vectors $n_{x0}$ and $n_{y0}$ for the band-separated low frequencies from the normal vector computing unit 310, and then computes a value Gradient for the XY plane by conducting the calculations shown in Eq. 37. In the case where band separation is not conducted, $n_x$ and $n_y$ may be used as-is.

$$\text{Gradient} = \sqrt{n_{x0}^2 + n_{y0}^2} \quad (37)$$

Using a relationship to be hereinafter described with reference to FIG. 13A, the gradient reliability generator 422 computes the gradient reliability $\alpha_R$ from the value Gradient for the XY plane that was computed by the gradient reliability detector 421. The gradient reliability generator 422 then supplies the computed gradient reliability $\alpha_R$ to the control signal synthesis arithmetic unit 431.

Herein, the gradient reliability computing unit 420 uses the low-frequency normal vectors $n_{x0}$ and $n_{y0}$ to compute the gradient reliability $\alpha_R$. However, the invention is not limited thereto, and may also be configured such that the gradient reliability detector 421 receives as input the eigenvalue $\lambda 1$ shown in FIG. 9 (to be hereinafter described) from the light vector arithmetic unit 321, and the gradient reliability generator 422 subsequently uses the relationship shown in FIG. 13B (to be hereinafter described) to compute the gradient reliability $\alpha_R$ from the eigenvalue $\lambda 1$.

The control signal synthesizer 430 is provided with a control signal synthesis arithmetic unit 431. The control signal synthesis arithmetic unit 431 uses Eq. 38 shown below to compute a shadow addition control signal $\alpha_i$ from the edge rims intensity $\alpha_0$ supplied by the edge rims intensity generator 412 and the gradient reliability CLR supplied by the gradient reliability generator 422. The control signal synthesis arithmetic unit 431 then supplies the computed shadow addition control signal $\alpha_i$ to an image multiplier 510.

$$\alpha_i = \alpha_0 \times (1.0 - \alpha_R) \quad (38)$$

The image compositor 500 is provided with an image multiplier 510 and an image adder 520.

The image multiplier 510 uses Eq. 39 shown below to generate final shadow image information Diff, being expressed as difference values with respect to the input image, from the shadow component $\Delta$shade supplied from the summer 333, the global luminous intensity information $f_G$ supplied from the luminous intensity information separation processor 110, and the shadow addition control signal $\alpha_i$ supplied from the control signal synthesis arithmetic unit 431. The image multiplier 510 then supplies the generated shadow image information Diff to the image adder 520.

$$\text{Diff} = \alpha_i \times G(f) \times \Delta\text{shade} \quad (39)$$

Herein, the locations where shadows are applied are controlled by introducing the shadow addition control signal $\alpha_i$. In addition, G(f) is an arbitrary function, with the function shown in Eq. 40 being used herein. In this case, the application of shadows is varied according to the brightness of the image.

$$G(f) = f_G \quad (40)$$

Furthermore, it is also possible to use the function shown in Eq. 41 as the function G(f). In this case, roughness is also applied to the roughness that was originally present ($f_L$).

$$G(f) = f_{in} \quad (41)$$

Figure 14:
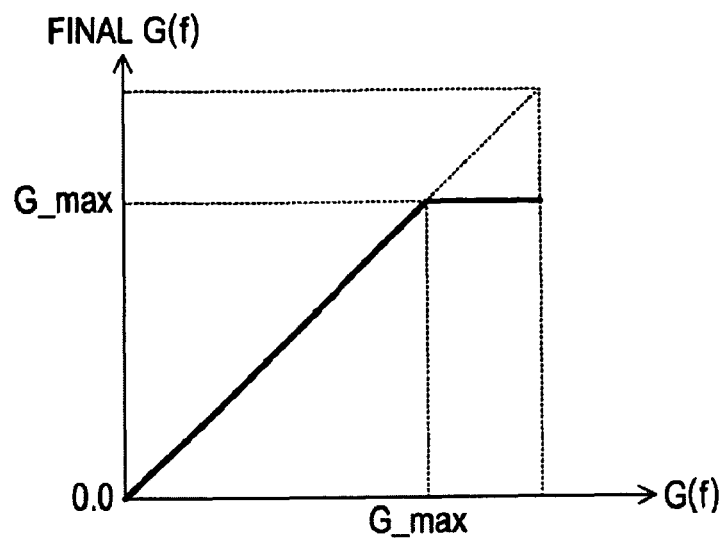
FIG. 14 is a diagram explaining processing for clipping the upper bound of G(f) that is conducted by an image compositor 500 in accordance with a first embodiment of the present invention.

In addition, the upper bound of G(f) may also be clipped as shown in FIG. 14 (to be hereinafter described), in order to suppress over-expression of the processing effect in bright regions.

Figure 15:
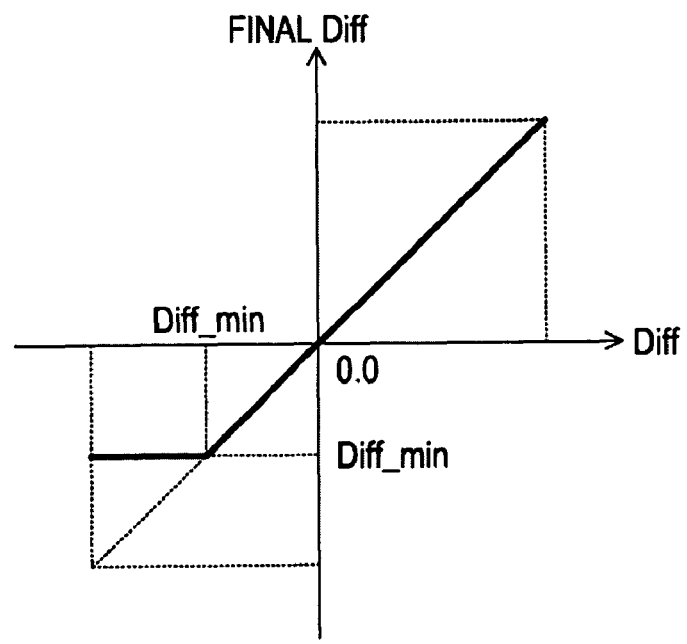
FIG. 15 is a diagram explaining processing for clipping the lower bound of shadow image information that is conducted by an image compositor 500 in accordance with a first embodiment of the present invention.

In addition, if darker shadows are overly expressed and look unpleasant, then the above shadow image information Diff that expresses the final difference between the input and output images may be processed so as to clip the darker shadows, as shown in FIG. 15 (to be hereinafter described).

The image adder 520 uses Eq. 42 to compute, and subsequently output, output image information $f_{out}$ from the input image information $f_{in}$ supplied from the image multiplier 510.

$$f_{out} = f_{in} + \alpha_i G(f) \times \Delta\text{shade} \quad (42)$$

FIGS. 3A to 3D are diagrams showing examples of the function C used by the luminous intensity information separation processor 110 in accordance with the first embodiment of the present invention. In FIGS. 3A to 3D, the horizontal axes represent an input signal, while the vertical axes represent the output signal of respective functions C. In each variation of the function C, it can be seen that portions where the absolute value of the input signal is large are suppressed in the output signal of the function C, and thus the function C has the effect of attenuating high-amplitude components. Consequently, it is possible to select any variation of the function C shown in FIGS. 3A to 3D for use as the function C in Eqs. 2 and 5.

Figure 4:
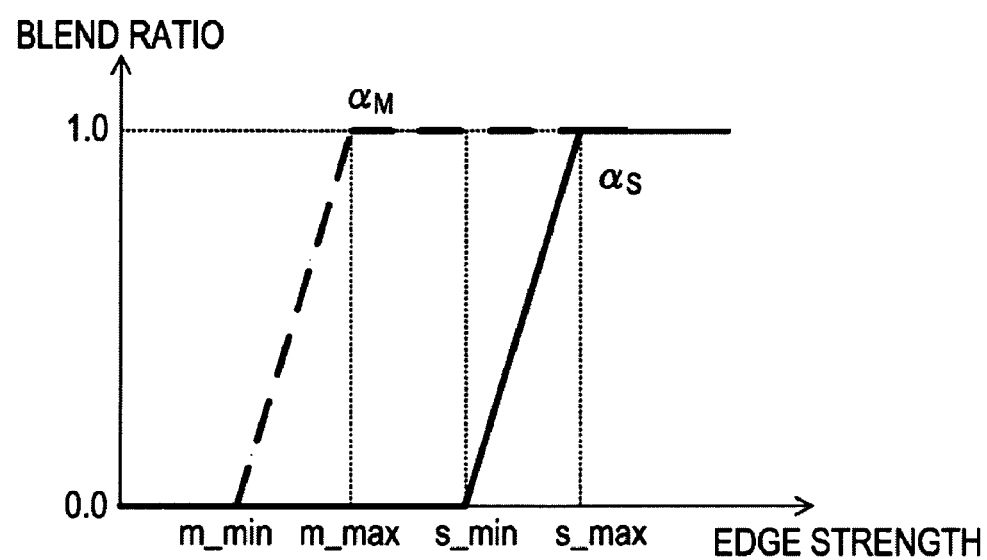
FIG. 4 is a diagram illustrating exemplary blend ratios $\alpha_S$ and $\alpha_M$ used by a luminous intensity information separation processor 110 in accordance with a first embodiment of the present invention.

FIG. 4 is a diagram illustrating an example of the blend ratios $\alpha_S$ and $\alpha_M$ used by the luminous intensity information separation processor 110 in accordance with the first embodiment of the present invention. In FIG. 4, the horizontal axis represents edge strength, while the vertical axis represents the blend ratio. The solid line illustrates the characteristics of the blend ratio $\alpha_S$, while the broken line illustrates the characteristics the blend ration $\alpha_M$. From the figure, it can be seen that for high edge strengths, both the blend ratio $\alpha_S$ and the blend ratio $\alpha_M$ exhibit high values. For intermediate edge strengths, only the blend ratio $\alpha_M$ exhibits a high value. For low edge strengths, both the blend ratio $\alpha_S$ and the blend ratio $\alpha_M$ exhibit low values.

Figure 5:
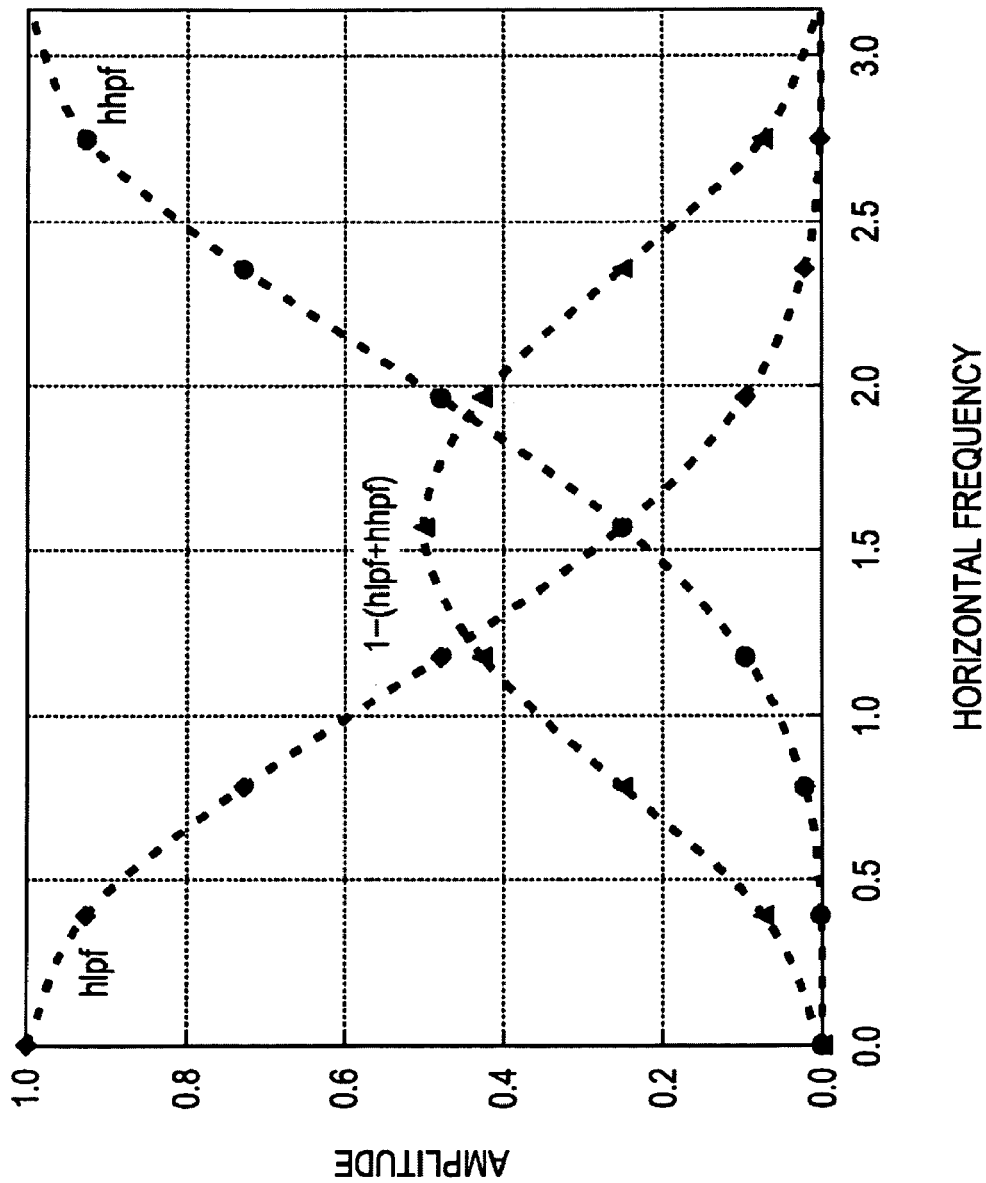
FIG. 5 is a diagram illustrating exemplary horizontal band separation filters used by a band separation processor 210 in accordance with a first embodiment of the present invention.

FIG. 5 is a diagram illustrating an example of the horizontal band separation filters used by the band separation processor 210 in accordance with the first embodiment of the present invention. In FIG. 5, the horizontal axis represents the horizontal frequency, while the vertical axis represents the amplitude. Herein, it can be seen that hlpf is used as a low-frequency band filter, hhpf is used as a high-frequency band filter, and (1−(hlpf+hhpf)) is used as a mid-frequency band filter. Although FIG. 5 illustrates horizontal filters only, it should be appreciated that the vertical filters vlpf and vhpf exhibit the same characteristics as shown in FIG. 5, but wherein the horizontal axis represents the vertical frequency.

Figure 6:
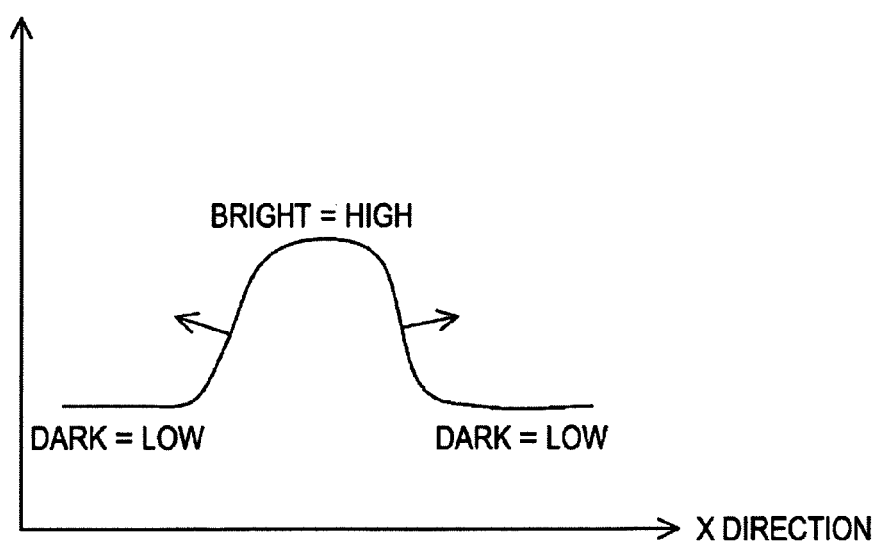
FIG. 6 is a diagram explaining normal vectors computed by a normal vector computing unit 310 in accordance with a first embodiment of the present invention.

FIG. 6 is a diagram explaining the normal vectors computed by the normal vector computing unit 310 in accordance with the first embodiment of the present invention. In FIG. 6, the horizontal axis represents position along the x direction, while the vertical axis represents luminous intensity. Consequently, the characteristic curve shown in FIG. 6 illustrates displacement of luminous intensity information along the x direction. Given the assumption that, in the natural world, brightness corresponds to objects nearby and darkness corresponds to objects farther away, the normal vectors may be defined as derivatives of the luminous intensity information. Consequently, the arrows shown in FIG. 6 define the x components of the normal vectors. By similarly defining the y components of the normal vectors from derivatives of the luminous intensity information in the y direction, the normal vectors can be computed.

Figure 7:
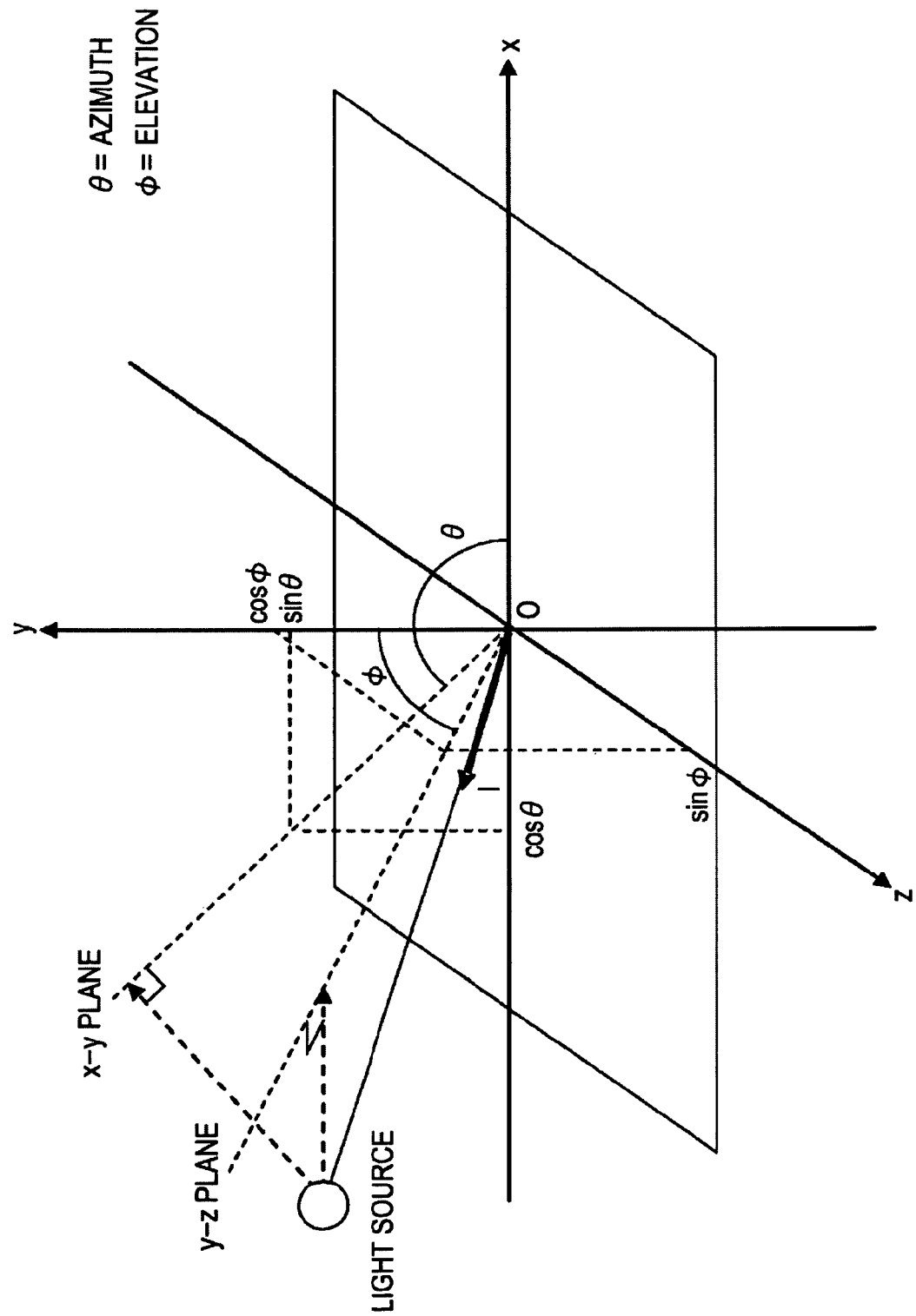
FIG. 7 is a diagram explaining a light vector computed by a light vector computing unit 320 in accordance with a first embodiment of the present invention.

FIG. 7 is a diagram explaining the light vector computed by the light vector computing unit 320 in accordance with the first embodiment of the present invention. In FIG. 7, a light vector is a unit vector indicating the direction of the light source in a three-dimensional space represented by the x, y, and z axes. The light vector itself is represented using an azimuthal angle θ that indicates the direction of the light source in the xy plane, as well as an elevation angle φ that indicates the direction of the light source in the yz plane (cf. Eq. 23).

Figure 8:
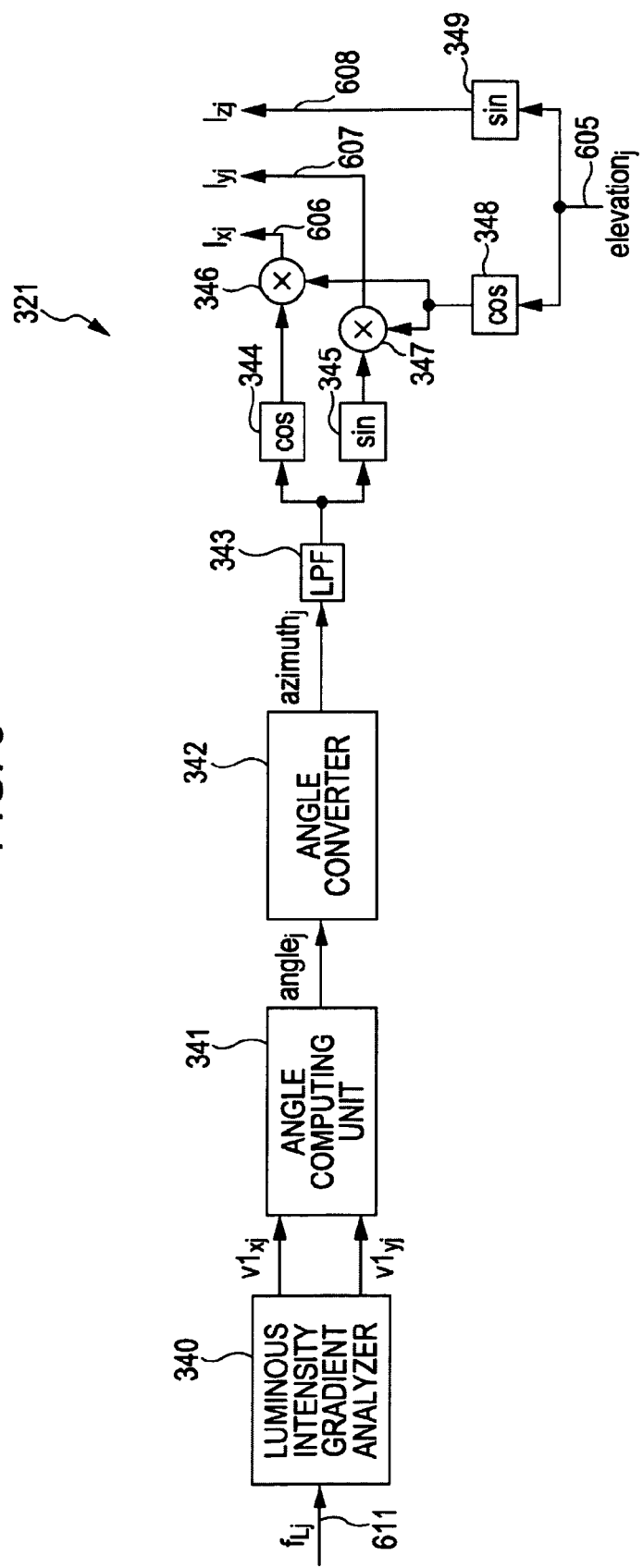
FIG. 8 a diagram illustrating an exemplary configuration of a light vector arithmetic unit 321 in an image processing apparatus 800 in accordance with a first embodiment of the present invention.

FIG. 8 is a diagram illustrating an exemplary configuration of the light vector arithmetic unit 321 in an image processing apparatus 800 in accordance with the first embodiment of the present invention.

The light vector arithmetic unit 321 is provided with a luminous intensity gradient analyzer 340, an angle computing unit 341, an angle converter 342, an LPF 343, cosine operators 344 and 348, sine operators 345 and 349, and multipliers 346 and 347.

The luminous intensity gradient analyzer 340 first solves for the direction of the luminous intensity gradient from the per-band luminous intensity information $f_{Lj}$ received as input from the signal line 611. This is done in order to determine the direction of the light source. The direction of the luminous intensity gradient may be solved for using a method that computes the maximum value for the luminous intensity gradient direction (i.e., the maximum angle) for a region in the vicinity of a focus pixel. The method for computing the maximum value for the luminous intensity gradient direction will be hereinafter described with reference to FIG. 9. The luminous intensity gradient analyzer 340 computes per-band edge gradient directions $v1_j$ for use as the per-band maximum values for the luminous intensity gradient direction, and then supplies the x components $v1_{xj}$ and y components $v1_{yj}$ thereof to the angle computing unit 341.

The angle computing unit 341 uses Eqs. 43 and 44 shown below to compute per-band maximum luminous intensity gradient directions $angle_j$ from the x components $v1_{xj}$ and the y components $v1_{yj}$ of the per-band edge gradient directions $v1_j$. Herein, a tan( ) is a function that calculates the arctangent of an input value, while sgn( ) is a function that returns the sign of an input value. In addition, a tan( ) is also a function that calculates the arctangent of an input value, but differs from a tan( ) in that the domain of a tan 2( ) is from (−π) to (π), while the domain of a tan( ) is from (−π/2) to (π/2). The angle computing unit 341 subsequently supplies the computed per-band maximum luminous intensity gradient directions $angle_j$ to the angle converter 342.

$$a\tan2(y, x) = \begin{cases} a\tan(y/x) & (x \geq 0) \\ \pi\text{sgn}(y) + a\tan(y/x) & (x \leq 0) \end{cases} \quad (43)$$

$$\text{sgn}(y) = \begin{cases} 1 & (y \geq 0) \\ -1 & (y \leq 0) \end{cases} \quad (44)$$

The angle converter 342 conducts the angle conversion shown in FIG. 10 (to be hereinafter described) to thereby compute per-band azimuthal angles $\theta_j$ from the per-band maximum luminous intensity gradient directions $angle_j$ supplied from the angle computing unit 341. The angle converter 342 computes the per-band azimuthal angles $\theta_j$ from the per-band maximum luminous intensity gradient directions $angle_j$ on the basis of a constraint that limits the resulting angles to those indicating a light source from above. This is done in consideration of the fact that light sources illuminate from above in the natural world, and that light sources illuminating from below appear unnatural. The constraint is also applied in order to maintain continuity in the resulting values. The angle converter 342 subsequently supplies the computed per-band azimuthal angles $\theta_j$ to the LPF 343.

The LPF 343 takes the per-band azimuthal angles $\theta_j$ received as input from the angle converter 342 and applies thereto a two-dimensional LPF, thereby computing final azimuthal angles $\theta_j$. The LPF 343 operates under the assumption that the direction of the light source varies gradually, and furthermore operates so as to increase robustness with respect to variations in the luminous intensity gradient. The LPF 343 subsequently supplies the computed final azimuthal angles $\theta_j$ to the cosine operator 344 and the sine operator 345.

The cosine operators 344 and 348, the sine operators 345 and 349, and the multipliers 346 and 347 use Eq. 24 shown above to compute per-band light vectors $l_j$ from the final azimuthal angles $\theta_j$ supplied from the LPF 343 and the elevation angles $\phi_j$ received as input via the signal line 605. The x components $l_{xj}$, the y components $l_{yj}$, and the z components $l_{zj}$ of the computed per-band light vectors $l_j$ are then supplied to the normalized inner product arithmetic unit 331 via the signal lines 606, 607, and 608, respectively.

Figure 9:
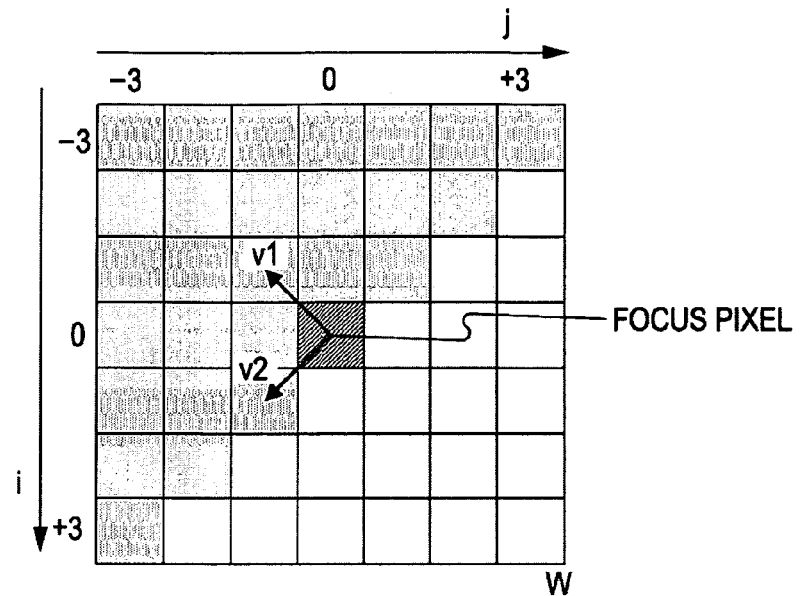
FIG. 9 is a diagram explaining an edge gradient direction v1 and an edge direction v2 computed by a luminous intensity gradient analyzer 340 in accordance with a first embodiment of the present invention.

FIG. 9 is a diagram explaining the edge gradient direction v1 and the edge direction v2 computed by the luminous intensity gradient analyzer 340 in accordance with the first embodiment of the present invention.

For each pixel in an input image, the luminous intensity gradient analyzer 340 detects the edge gradient direction v1 whereby the gradient of pixel values is maximized, as well as an edge direction v2 orthogonal to the edge gradient direction v1. For example, each pixel may be successively selected as a focus pixel in raster order, and then arithmetic processing may be conducted using the pixel values within an region W centered on the current focus pixel, as shown in FIG. 9. In so doing, a luminous intensity gradient matrix G as shown in Eq. 45 is generated for each pixel. In the example shown in FIG. 9, the region W is set to be ±3 pixels in the x and y directions, and centered on the focus pixel.

In addition, $w^{(i,j)}$ represents Gaussian weight values as shown in Eq. 46, while g represents the luminous intensity gradient found by taking the partial derivative $g_x$ of the luminous intensity I of the image in the x direction as well as the partial derivative $g_y$ of the same in the y direction, as shown in Eq. 47.

$$G = \int_W gg^T w \, dA \qquad (45)$$
$$= \sum_W \begin{pmatrix} g_x^{(i,j)} g_x^{(i,j)} w^{(i,j)} & g_x^{(i,j)} g_y^{(i,j)} w^{(i,j)} \\ g_x^{(i,j)} g_y^{(i,j)} w^{(i,j)} & g_y^{(i,j)} g_y^{(i,j)} w^{(i,j)} \end{pmatrix}$$
$$= \begin{pmatrix} G_{xx} & G_{xy} \\ G_{xy} & G_{yy} \end{pmatrix}$$

$$w^{(i,j)} = \exp\left(-\frac{i^2 + j^2}{2\sigma^2}\right) \qquad (46)$$

$$g = (g_x, g_y) \qquad (47)$$
$$= \left(\frac{\partial I}{\partial x}, \frac{\partial I}{\partial y}\right)$$

As a result of the above, the luminous intensity gradient analyzer 340 detects the luminous intensity gradient for a given region W centered on a focus pixel, with the resulting gradient being weighted on the basis of the focus pixel.

By processing the above matrix G of the luminous intensity gradient, the luminous intensity gradient analyzer 340 detects, for a respective focus pixel, an edge gradient direction v1 whereby the pixel gradient is maximized, as well as an edge direction v2 orthogonal to the edge gradient direction v1, as shown in FIG. 9. In addition, the luminous intensity gradient analyzer 340 detects eigenvalues λ1 and λ2 with respect to the edge gradient direction v1 and the edge direction v2. The eigenvalues λ1 and λ2 indicate the degree of scattering in the gradients of respective pixel values.

More specifically, the luminous intensity gradient analyzer 340 conducts arithmetic processing as shown in Eqs. 48 to 52, thereby detecting the edge gradient direction v1, the edge direction v2, and the eigenvalues λ1 and λ2 (λ1≧λ2).

$$\lambda 1 = \frac{G_{xx} + G_{yy} + \sqrt{a}}{2} \qquad (48)$$

$$\lambda 2 = \frac{G_{xx} + G_{yy} - \sqrt{a}}{2} \qquad (49)$$

$$v1 = \frac{v'1}{\|v'1\|} \qquad (50)$$
$$v'1 = \left(\frac{G_{xx} - G_{yy} + \sqrt{a}}{2G_{xy}}, 1\right)$$

$$v2 = \frac{v'2}{\|v'2\|} \qquad (51)$$
$$v'2 = \left(\frac{G_{xx} - G_{yy} - \sqrt{a}}{2G_{xy}}, 1\right)$$

$$a = G_{xx}^2 + 4G_{xy}^2 - 2G_{xx}G_{yy} + G_{yy}^2 \qquad (52)$$

At this point, the luminous intensity gradient analyzer 340 computes per-band edge gradient directions $v1_j$, and then supplies $v1_j$ to the angle computing unit 341 as the per-band values of the maximum luminous intensity gradient direction (angle$_j$).

Figure 10:
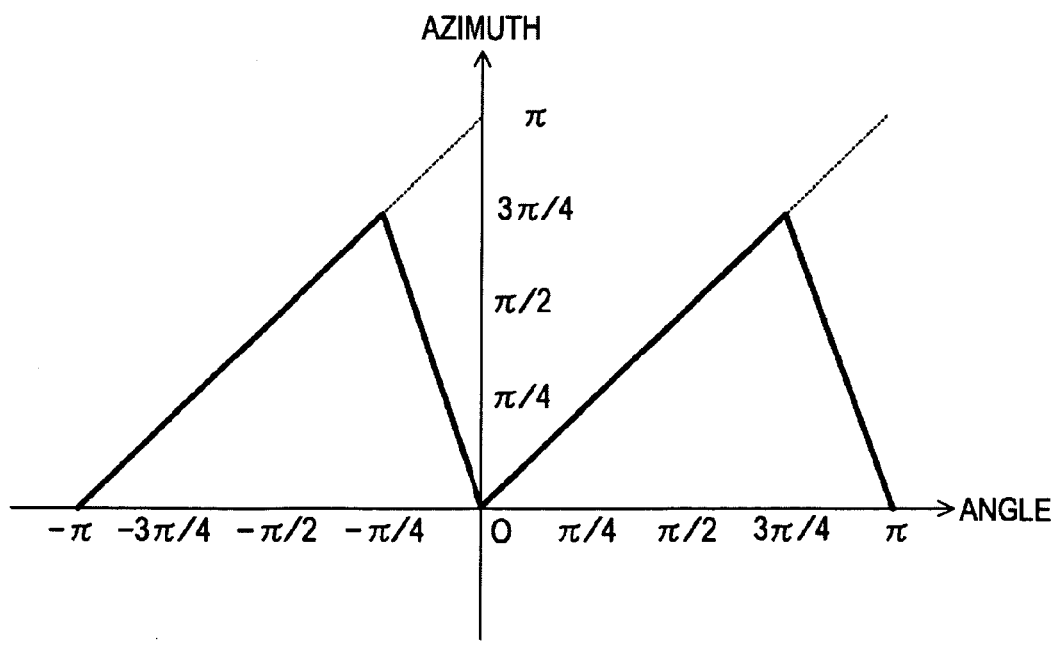
FIG. 10 is a diagram explaining angle conversion conducted by an angle converter 342 in accordance with a first embodiment of the present invention.

FIG. 10 is a diagram explaining the angle conversion conducted by the angle converter 342 in accordance with the first embodiment of the present invention.

In FIG. 10, the horizontal axis represents the angles indicative of the maximum luminous intensity gradient direction (herein, the input signal), while the vertical axis represents the azimuthal angles θ$_j$ (herein, the output signal). From FIG. 10, it can be seen that the characteristic curve of the azimuthal angles θ$_j$ varies continuously with respect to variations in the maximum luminous intensity gradient direction, and also that the azimuthal angles θ$_j$ are located in the upper quadrants (i.e., from 0 to π).

Figure 11:
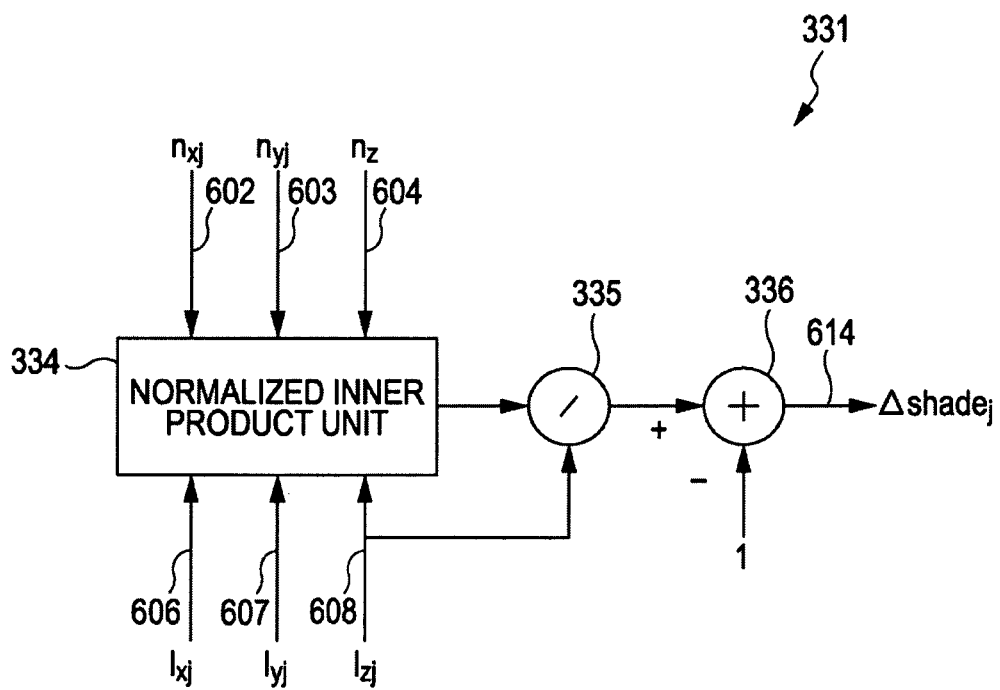
FIG. 11 is a diagram explaining the arithmetic operations conducted by a normalized inner product arithmetic unit 331 in accordance with a first embodiment of the present invention.

FIG. 11 is a diagram explaining the calculations performed by the normalized inner product arithmetic unit 331 in accordance with the first embodiment of the present invention. The normalized inner product arithmetic unit 331 is provided with a normalized inner product unit 334, a divider 335, and an adder 336.

The normalized inner product unit 334 calculates the normalized inner product between the per-band normal vectors $n_j$, being supplied from the normal vector computing unit 310 via the signal lines 602 to 604, and the per-band light vectors $l_j$, being supplied from the light vector arithmetic unit 321 via the signal lines 606 to 608. The normalized inner product unit 334 then supplies the results of the above to the divider 335.

The divider 335 divides the normalized inner product results supplied from the normalized inner product unit 334 by $l_{zj}$, and then supplies the results to the adder 336.

The adder 336 adds the quantity (−1) to the quotient supplied from the divider 335, and then supplies the results to the multiplier 332 via a signal line 614. The above calculations correspond to the foregoing Eq. 27.

Figure 12A:
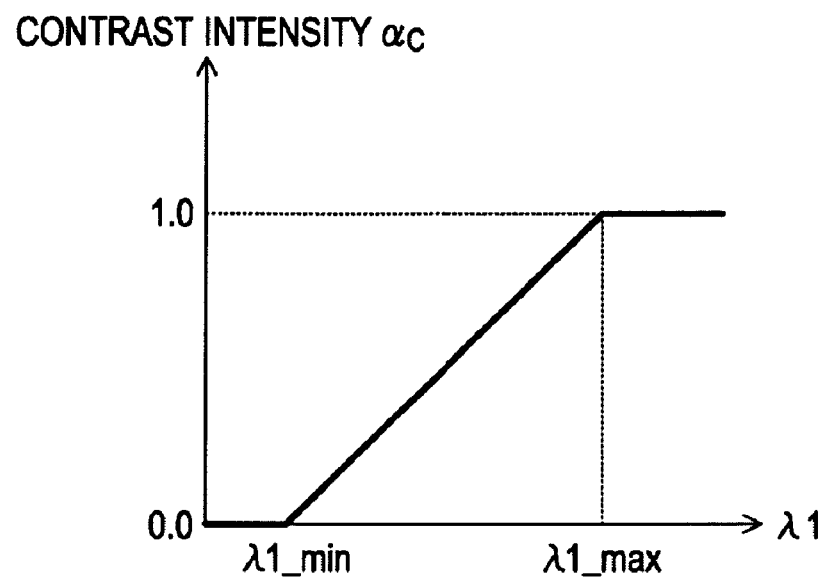
FIG. 12A is a diagram explaining a contrast intensity $\alpha_C$ used by an edge intensity computing unit 410 in accordance with a first embodiment of the present invention.
Figure 12B:
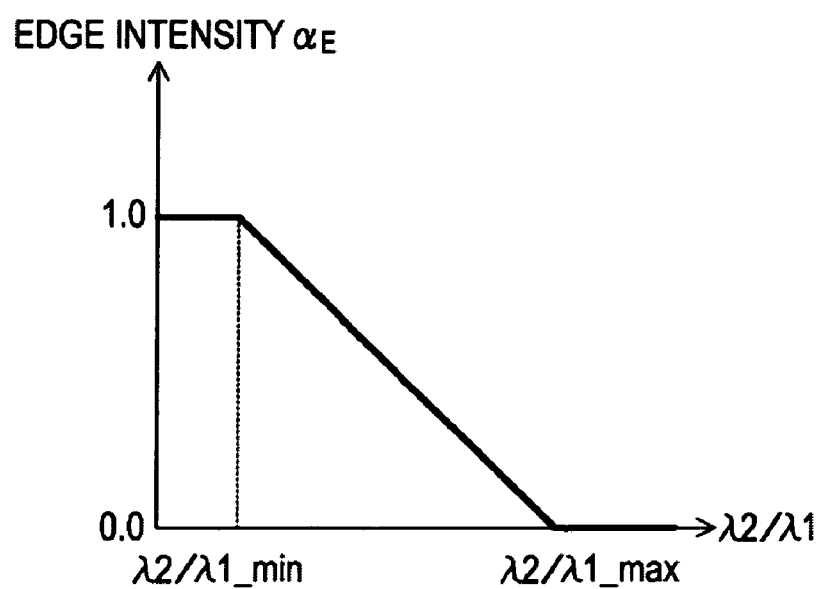
FIG. 12B is a diagram explaining an edge intensity $\alpha_E$ used by an edge intensity computing unit 410 in accordance with a first embodiment of the present invention.

FIGS. 12A and 12B are diagrams explaining the contrast intensity α$_C$ and the edge intensity α$_E$ used by the edge intensity computing unit 410 in accordance with the first embodiment of the present invention. FIG. 12A illustrates the contrast intensity α$_C$, while FIG. 12B illustrates the edge intensity α$_E$.

In FIG. 12A, the horizontal axis represents the eigenvalue λ1, while the vertical axis represents the contrast intensity α$_C$. The contrast intensity α$_C$ has a value of 0.0 until the eigenvalue λ1 reaches a value λ1_min. When the value of the eigenvalue λ1 is between λ1_min and λ1_max, the value of the contrast intensity ac increases linearly from 0.0 to 1.0. When the eigenvalue λ1 exceeds λ1_max, the contrast intensity ac takes a value of 1.0. In other words, the contrast intensity α$_C$ increases as the degree of contrast (i.e., value of the eigenvalue λ1) increases.

In FIG. 12B, the horizontal axis represents the eigenvalue ratio λ2/λ1, while the vertical axis represents the edge intensity α$_E$. The edge intensity α$_E$ has a value of 1.0 until the eigenvalue ratio λ2/λ1 reaches a value λ2/λ1_min. When the value of the eigenvalue ratio λ2/λ1 is between λ2/λ1_min and λ2/λ1_max, the value of the edge intensity α$_E$ decreases linearly from 1.0 to 0.0. When the eigenvalue ratio λ2/λ1 exceeds λ2/λ1_max, the edge intensity α$_E$ takes a value of 0.0. In other words, the edge intensity α$_E$ increases as the degree of edge sharpness increases (i.e., as the value of the eigenvalue ratio λ2/λ1 decreases).

Figure 13A:
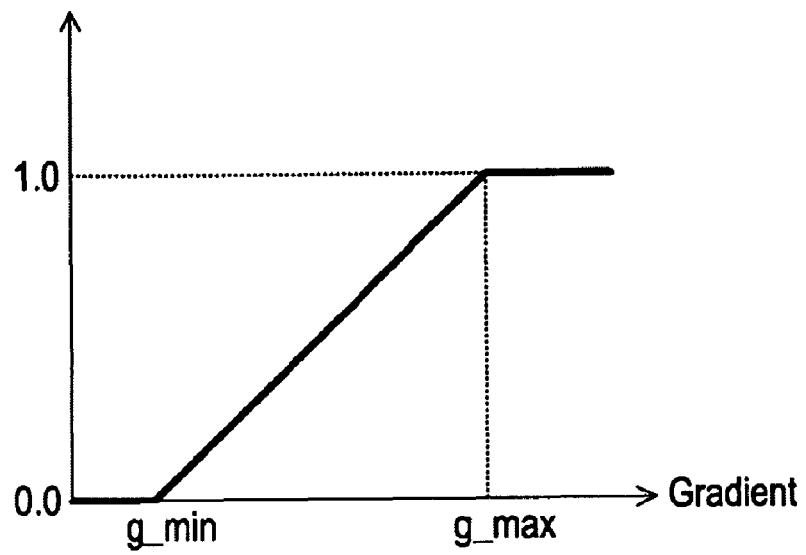
FIG. 13A is a diagram explaining a gradient reliability $\alpha_R$ used by a gradient reliability computing unit 420 in accordance with a first embodiment of the present invention.
Figure 13B:
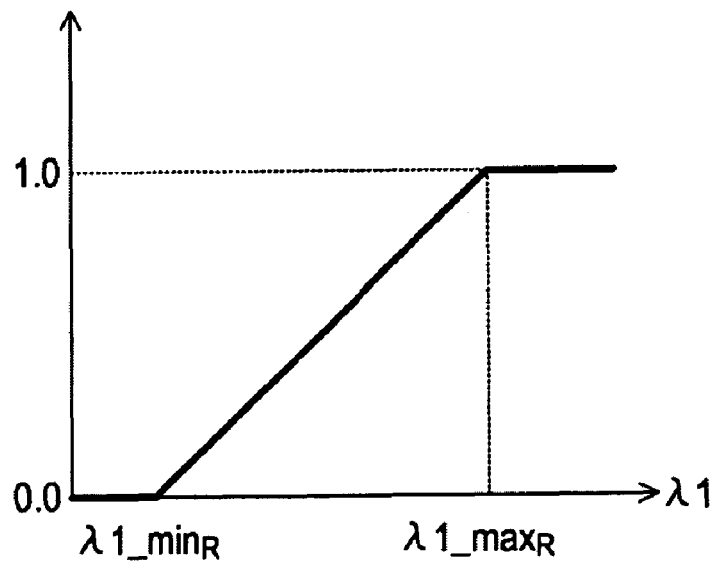
FIG. 13B is a diagram explaining a gradient reliability $\alpha_R$ used by a gradient reliability computing unit 420 in accordance with a first embodiment of the present invention.

FIGS. 13A and 13B are diagrams explaining the gradient reliability α$_R$ used by the gradient reliability computing unit 420 in accordance with the first embodiment of the present invention. FIG. 13A illustrates the case wherein the gradient reliability α$_R$ is computed from the gradient value Gradient for the XY plane, while FIG. 13B illustrates the case wherein the gradient reliability $\alpha_R$ is computed from the eigenvalue $\lambda 1$.

In FIG. 13A, the horizontal axis represents the gradient value Gradient, while the vertical axis represents the gradient reliability $\alpha_R$. The gradient reliability $\alpha_R$ has a value of 0.0 until the gradient value Gradient reaches a value g_min. When the gradient value Gradient is between g_min and g_max, the value of the gradient reliability $\alpha_R$ increases linearly from 0.0 to 1.0. When the gradient value Gradient exceeds g_max, the gradient reliability $\alpha_R$ takes a value of 1.0. In other words, the gradient reliability $\alpha_R$ increases as the degree of contrast (i.e., the value of Gradient) increases.

In FIG. 13B, the horizontal axis represents $\lambda 1$, while the vertical axis represents the gradient reliability $\alpha_R$. The gradient reliability $\alpha_R$ has a value of 0.0 until the eigenvalue. $\lambda 1$ reaches a value $\lambda 1\_min_R$. When the value of the eigenvalue is between $\lambda 1\_min_R$ and $\lambda 1\_max_R$, the value of the gradient reliability $\alpha_R$ increases linearly from 0.0 to 1.0. When the eigenvalue $\lambda 1$ exceeds $\lambda 1\_max_R$, the gradient reliability $\alpha_R$ takes a value of 1.0. In other words, the gradient reliability $\alpha_R$ increases as the degree of contrast (i.e., the value of the eigenvalue $\lambda 1$) increases.

FIG. 14 is a diagram explaining the processing for clipping the upper bound of G(f) that is conducted by the image compositor 500 in accordance with the first embodiment of the present invention. In FIG. 14, the horizontal axis represents the arbitrary function G(f), while the vertical axis represents the final function G(f) after conducting clipping processing. In this case, the clipping processing is such that a fixed value G_max is output from the final function G(f) when the value of the original function G(f) exceeds G_max.

FIG. 15 is a diagram explaining the processing for clipping the lower bound of the shadow image information Diff that is conducted by the image compositor 500 in accordance with the first embodiment of the present invention. In FIG. 15, the horizontal axis represents the shadow image information Diff, while the vertical axis represents the final shadow image information Diff after conducting clipping processing. In this case, the clipping processing is such that a fixed value Diff_min is output from the final shadow image information Diff when the value of the original shadow image information Diff is less than Diff_min.

In this way, according to the first embodiment of the present invention, an input image is processed while also considering the luminous intensity information thereof to generate an output image wherein apparent object surface roughness has been enhanced with respect to the input image, thereby reproducing texture different from that obtained by the enhancement processing of the related art.

Furthermore, by taking the global luminous intensity information of the image into consideration, a natural image is acquired without negatively affecting the perspective of the image.

In addition, by providing a band separator 200 to band-separate the local luminous intensity information $f_L$ and subsequently conduct processing using per-band luminous intensity information $f_{Lj}$, it is possible to freely control the application of roughness to the output image.

In addition, by providing a control signal generator 400 and conducting processing using a shadow addition control signal, a further degree of fine-grained control is achieved.

A second embodiment of the present invention will now be described in detail.

An image processing apparatus in accordance with the second embodiment of the present invention is provided with a light vector arithmetic unit 322 instead of the light vector arithmetic unit 321 provided in the image processing apparatus in accordance with the first embodiment of the present invention shown in FIG. 2. Other features of the configuration are identical to those of the first embodiment of the present invention, and for this reason further description thereof is omitted for the sake of brevity.

Figure 16:
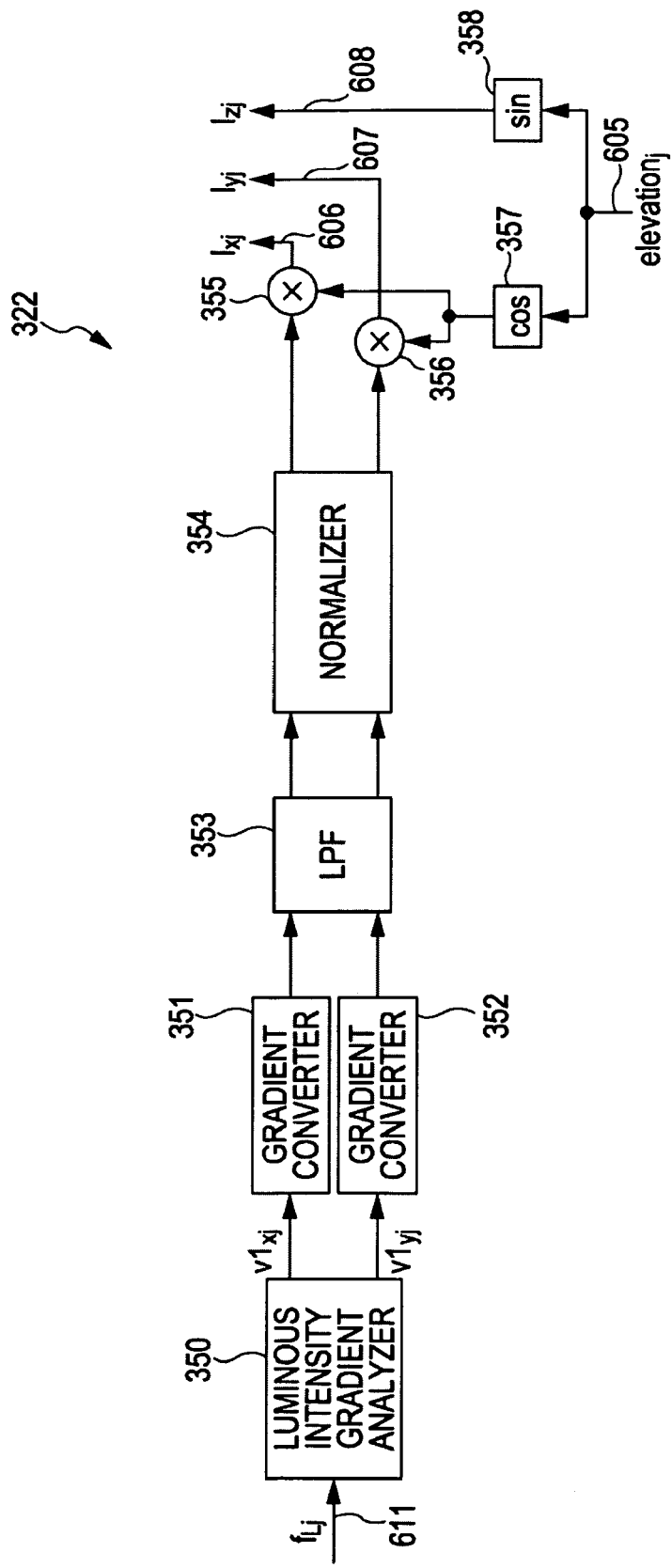
FIG. 16 is a diagram illustrating an exemplary configuration of a light vector arithmetic unit 322 in an image processing apparatus in accordance with a second embodiment of the present invention.

FIG. 16 is a diagram illustrating an exemplary configuration of the light vector arithmetic unit 322 in an image processing apparatus in accordance with the second embodiment of the present invention.

The light vector arithmetic unit 322 is provided with a luminous intensity gradient analyzer 350, gradient converters 351 and 352, an LPF 353, a normalizer 354, multipliers 355 and 356, a cosine operator 357, and a sine operator 358.

The luminous intensity gradient analyzer 350 is identical to the luminous intensity gradient analyzer 340 in accordance with the first embodiment of the present invention, and for this reason further description thereof is omitted for the sake of brevity.

The gradient converters 351 and 352 perform the vector conversion shown in FIG. 17 and Eq. 53 (to be hereinafter described). In so doing, advantages are obtained that are similar to those resulting from the angle conversion conducted by the angle converter 342 in accordance with the first embodiment of the present invention.

The gradient converter 351 uses the vector conversion technique shown in Eq. 53 to compute the x components $v1'_{xj}$ of per-band edge gradient directions v1' from the x components $v1_{xj}$ of the per-band edge gradient directions $v1_j$ supplied from the luminous intensity gradient analyzer 350. The gradient converter 351 then supplies the computed per-band x components $v1'_{xj}$ to the LPF 353.

The gradient converter 352 uses the vector conversion technique shown in Eq. 53 to compute the y components $v1'_{yj}$ of per-band edge gradient directions v1' from the y components $v1_{yj}$ of the per-band edge gradient directions $v1_j$ supplied from the luminous intensity gradient analyzer 350. The gradient converter 352 then supplies the computed per-band y components $v1'_{yj}$ to the LPF 353.

The LPF 353 takes the per-band x components $v1'_{xj}$ supplied from the gradient converter 351 and the y components $v1'_{yj}$ supplied from the gradient converter 352, and applies thereto a two-dimensional LPF. The LPF 353 operates under the assumption that the direction of the light source varies gradually, and furthermore operates so as to increase robustness with respect to variations in the luminous intensity gradient. The LPF 353 subsequently supplies the results of the above to the normalizer 354.

The normalizer 354 normalizes the per-band x components $v1'_{xj}$ and the per-band y components $v1'_{yj}$ that were processed by the LPF 353. The normalizer 354 then supplies the normalized per-band x components $v1'_{xj}$ to the multiplier 355, and the normalized per-band y components $v1'_{yj}$ to the multiplier 356.

The multiplier 355 respectively multiplies the normalized, per-band x components $v1'_{xj}$ by the cosines of the elevation angles $\phi_j$ (having been calculated by the cosine operator 357 and received as input via a signal line 605), thereby computing the x components $l_{xj}$ of the per-band light vectors $l_{xj}$. The multiplier 355 then supplies the computed x components $l_{xj}$ of the per-band light vectors $l_j$ to the normalized inner product arithmetic unit 331 via a signal line 606.

The multiplier 356 respectively multiplies the normalized, per-band y components $v1'_{yj}$ by the cosines of the elevation angles $\phi_j$ (having been calculated by the cosine operator 357 and received as input via the signal line 605), thereby computing the y components $l_{yj}$ of the per-band light vectors $l_{yj}$.

The multiplier 356 then supplies the computed y components $l_{yj}$ of the per-band light vectors $l_j$ to the normalized inner product arithmetic unit 331 via a signal line 607.

The sine operator 358 calculates the respective sines of the elevation angles $\phi_j$ received as input via a signal line 605, and then supplies the calculated results to the normalized inner product arithmetic unit 331 via a signal line 608.

Figure 17A:
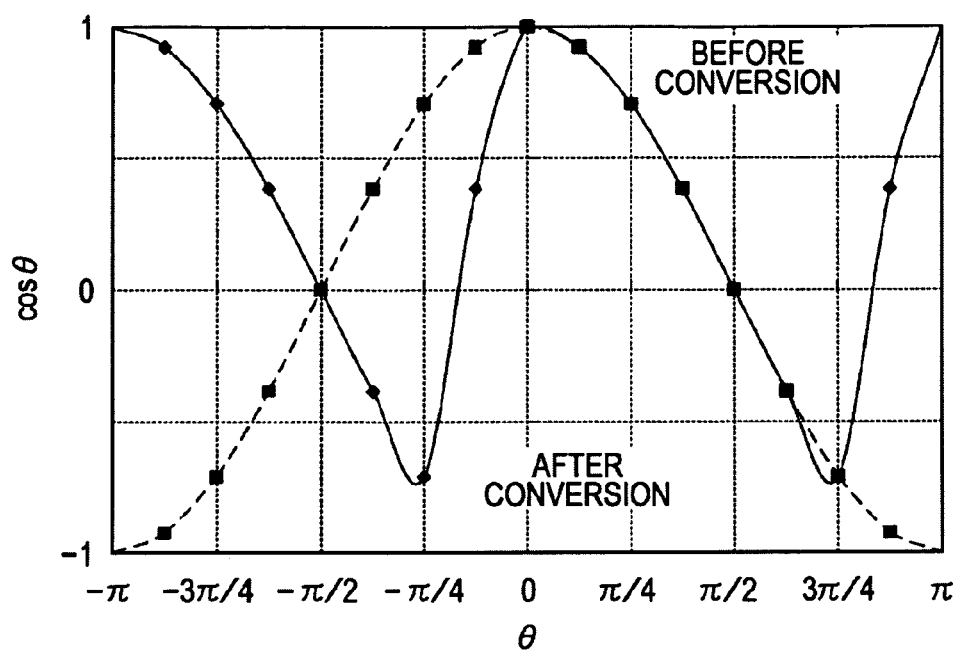
FIG. 17A is a diagram explaining vector conversion conducted by gradient converters 351 and 352 in accordance with a third embodiment of the present invention.
Figure 17B:
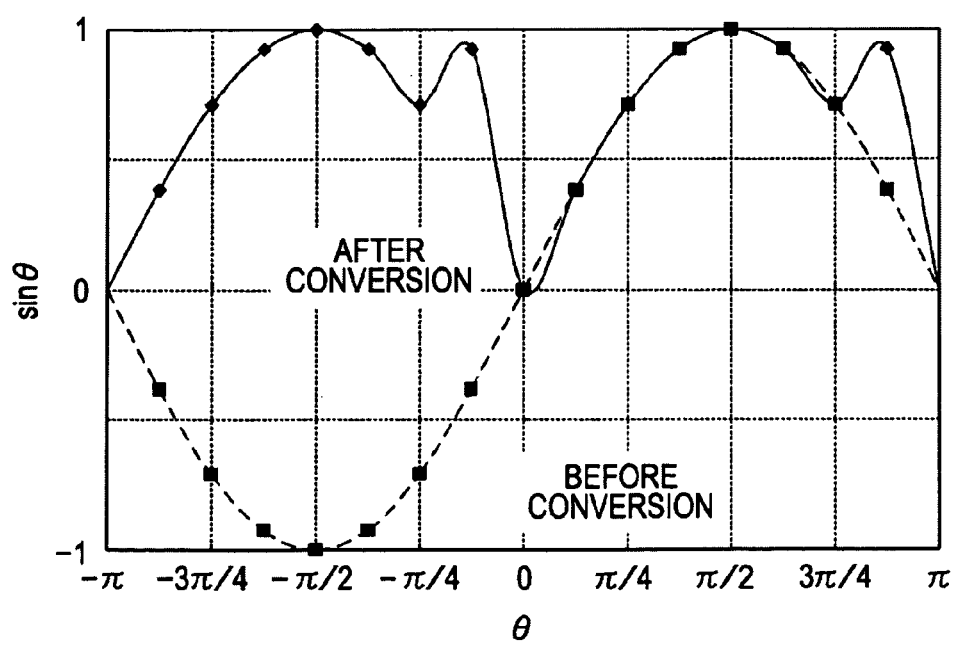
FIG. 17B is a diagram explaining vector conversion conducted by gradient converters 351 and 352 in accordance with a third embodiment of the present invention.

FIGS. 17A and 17B are diagrams explaining the vector conversion conducted by the gradient converters 351 and 352 in accordance with the second embodiment of the present invention. FIG. 17A illustrates the case wherein $\cos(\theta)$ is applied to the angle conversion in accordance with the first embodiment of the present invention as shown in FIG. 10, while FIG. 17B illustrates the case wherein $\sin(\theta)$ is applied to the same.

In both FIGS. 17A and 17B, the horizontal axis represents the maximum luminous intensity gradient direction $\theta$, while the vertical axis represents the arithmetic results of $\cos(\theta)$ and $\sin(\theta)$, respectively.

The vector calculations indicated in FIG. 17 correspond to the conversion technique shown in Eq. 53. Herein, $m_x$ and $m_y$ are two-dimensional unit vectors, while $m'_x$ and $m'_y$ are the two-dimensional unit vectors after conversion.

$$(m'_x, m'_y) = \begin{cases} (-m_x, -m_y) & (-1 \le m_x \le 1/\sqrt{2}, m_y \le 0) \\ (-3m_x + 4m_x^3, -3m_y + 4m_y^3) & (1/\sqrt{2} < m_x \le 1, m_y \le 0) \\ (m_x, m_y) & (-1/\sqrt{2} \le m_x \le 1, m_y \ge 0) \\ (3m_x - 4m_x^3, 3m_y - 4m_y^3) & (-1 < m_x \le -1/\sqrt{2}, m_y \ge 0) \end{cases} \quad (53)$$

In this way, according to the second embodiment of the present invention, advantages similar to those of the first embodiment of the present invention are obtained. Moreover, image processing is conducted by means of vector conversion instead of angle conversion.

A third embodiment of the present invention will now be described in detail and with reference to the accompanying drawings.

Figure 18:
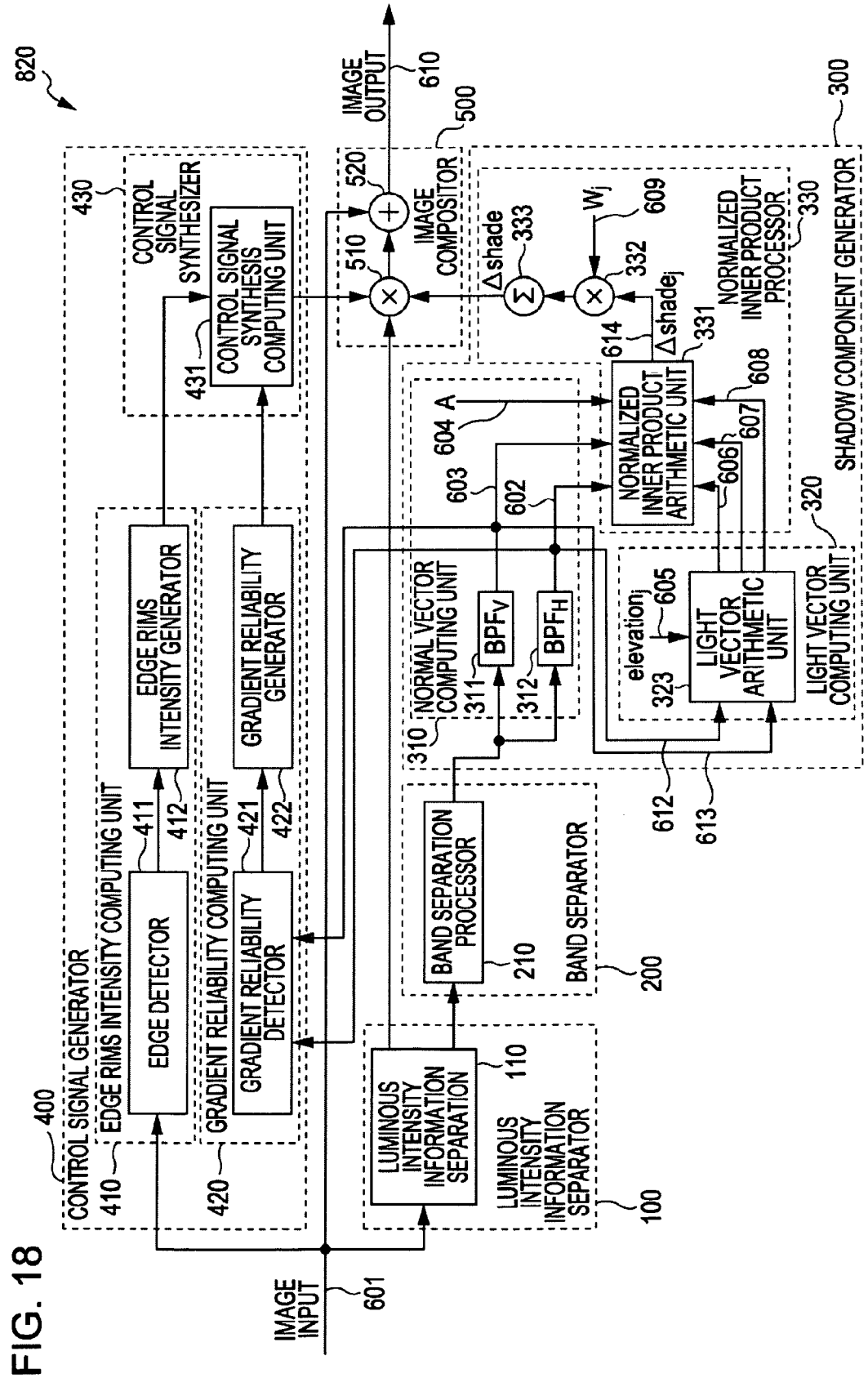
FIG. 18 is a diagram illustrating an exemplary configuration of an image processing apparatus 820 in accordance with a third embodiment of the present invention.

FIG. 18 is a diagram illustrating an exemplary configuration of an image processing apparatus 820 in accordance with the third embodiment of the present invention.

The image processing apparatus 820 is provided with a light vector arithmetic unit 323. The light vector arithmetic unit 323 receives per-band normal vectors ($n_{xj}$, $n_{yj}$) as input from a normal vector computing unit 310, and then computes therefrom per-band light vectors ($l_{xj}$, $l_{yj}$, $l_{zj}$). Other features of the configuration are identical to those of the first embodiment of the present invention, and for this reason further description thereof is omitted for the sake of brevity.

Figure 19:
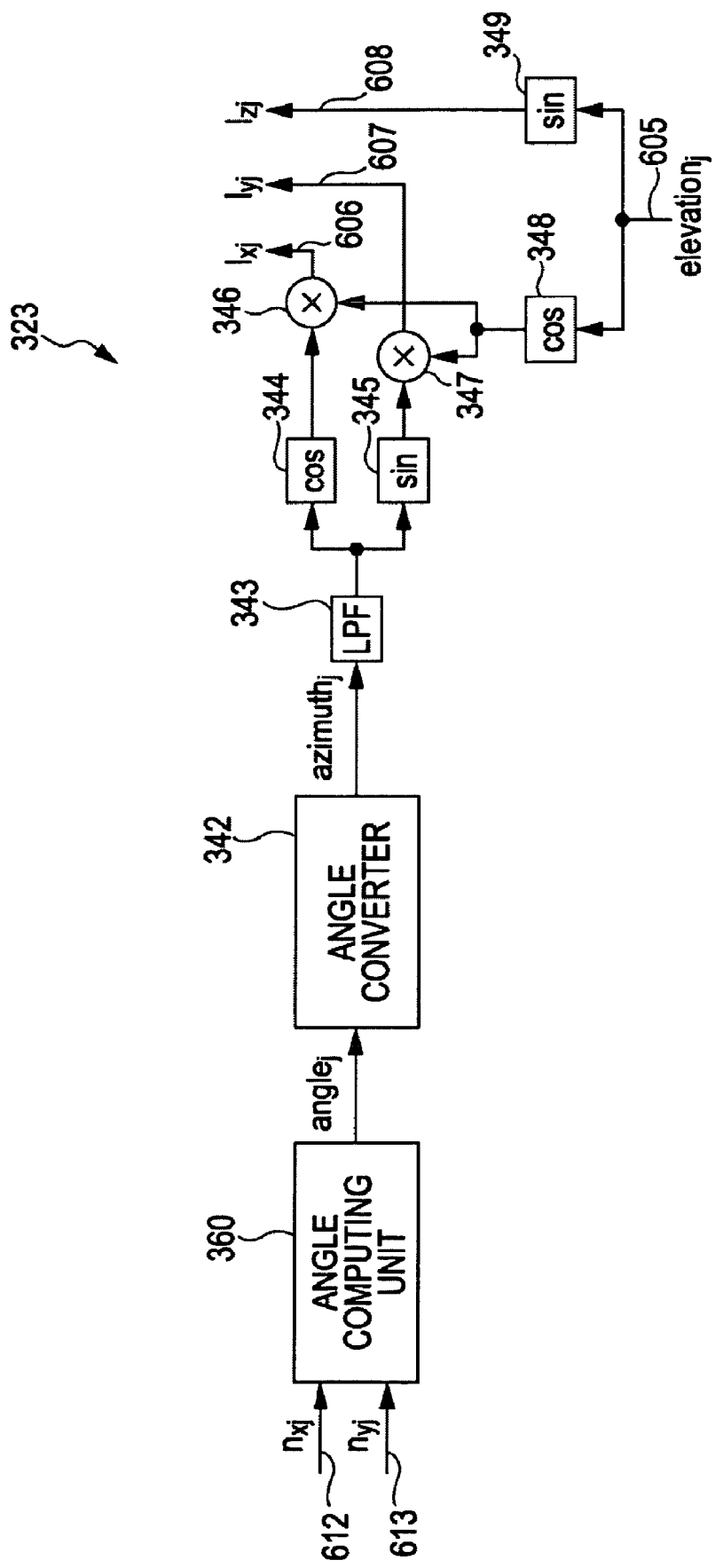
FIG. 19 is a diagram illustrating an exemplary configuration of a light vector arithmetic unit 323 in an image processing apparatus in accordance with a third embodiment of the present invention.

FIG. 19 is a diagram illustrating an exemplary configuration of the light vector arithmetic unit 323 in the image processing apparatus 820 in accordance with the third embodiment of the present invention.

The light vector arithmetic unit 323 is provided with an angle computing unit 360. Other features of the configuration are identical to those of the first embodiment of the present invention, and for this reason further description thereof is omitted for the sake of brevity.

The angle computing unit 360 uses Eqs. 43 and 44 shown above to compute per-band values $angle_j$ for the maximum luminous intensity gradient direction from the per-band normal vectors ($n_{xj}$, $n_{yj}$) supplied from the normal vector computing unit 310. The angle computing unit 360 subsequently supplies the computed per-band values $angle_j$ for the maximum luminous intensity gradient direction to the angle converter 342.

In this way, according to the third embodiment of the present invention, advantages similar to those of the first embodiment of the present invention are obtained. Moreover, since the light vectors are computed using the per-band normal vectors $n_j$ instead of the per-band edge gradient directions $v1_j$, the computational load involved in the above is reduced.

A fourth embodiment of the present invention will now be described in detail.

An image processing apparatus in accordance with the fourth embodiment of the present invention is provided with a light vector arithmetic unit 324 instead of the light vector arithmetic unit 323 provided in the image processing apparatus in accordance with the third embodiment shown in FIG. 18. Other features of the configuration are identical to those of the third embodiment of the present invention, and for this reason further description thereof is omitted for the sake of brevity.

Figure 20:
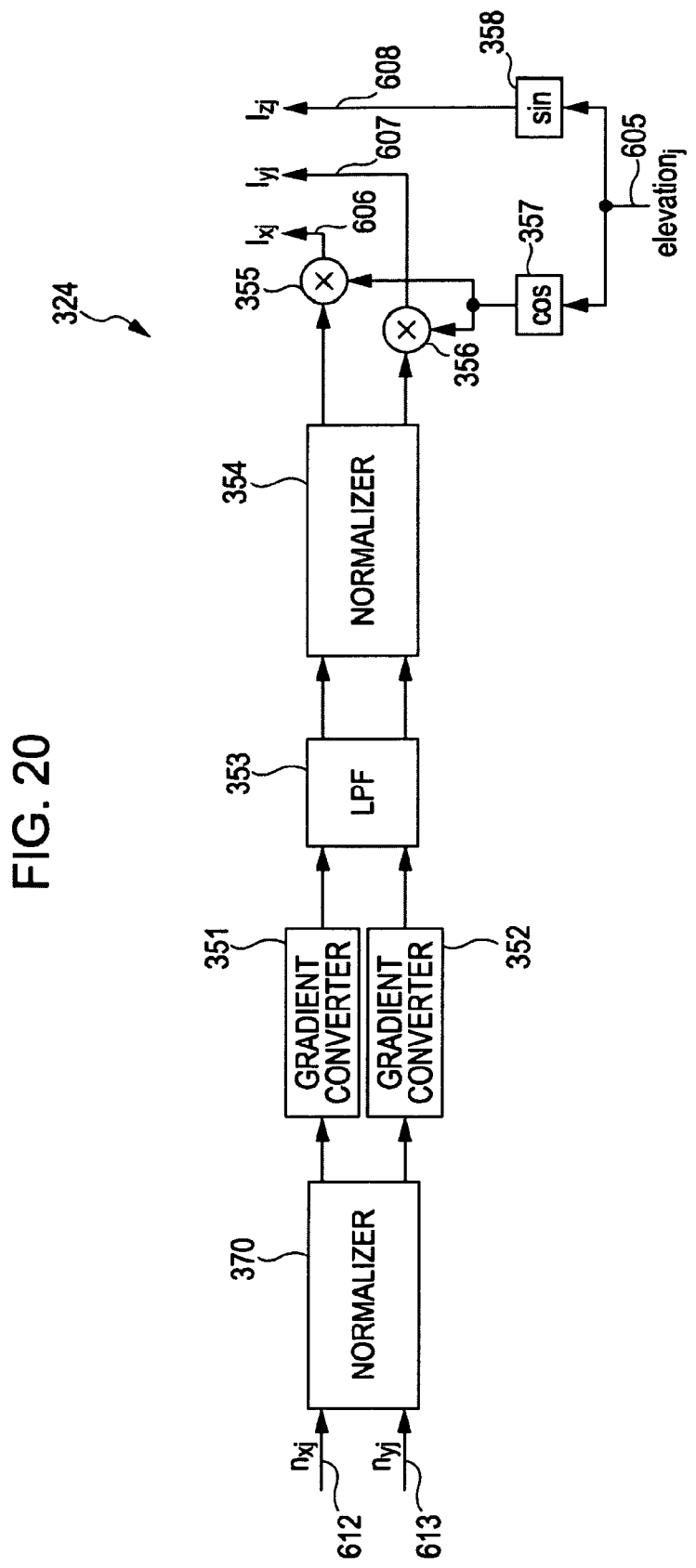
FIG. 20 is a diagram illustrating an exemplary configuration of a light vector arithmetic unit 324 in an image processing apparatus in accordance with a fourth embodiment of the present invention.

FIG. 20 is a diagram illustrating an exemplary configuration of the light vector arithmetic unit 324 in an image processing apparatus in accordance with the fourth embodiment of the present invention.

The light vector arithmetic unit 324 is provided with a normalizer 370. Other features of the configuration are identical to those of the second embodiment of the present invention, and for this reason further description thereof is omitted for the sake of brevity.

The normalizer 370 normalizes, in two-dimensions, the per-band normal vectors ($n_{xj}$, $n_{yj}$) supplied from the normal vector computing unit 310. The normalizer 370 then supplies the normalized normal vectors $n_{xj}$ to the gradient converter 351, and the normalized normal vectors $n_{yj}$ to the gradient converter 352.

In this way, according to the fourth embodiment of the present invention, advantages similar to those of the third embodiment of the present invention are obtained.

A fifth embodiment of the present invention will now be described in detail and with reference to the accompanying drawings.

Figure 21:
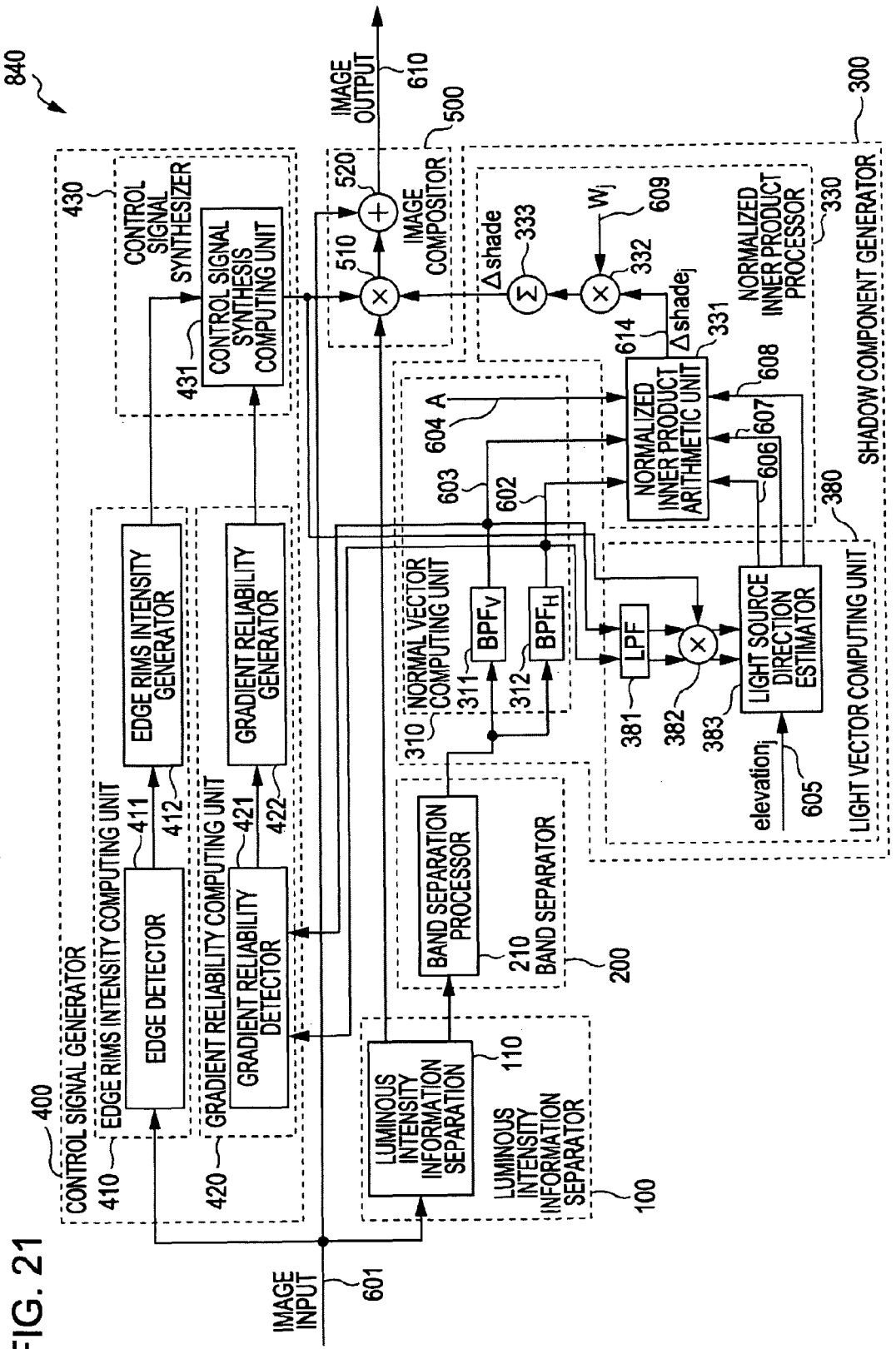
FIG. 21 is a diagram illustrating an exemplary configuration of an image processing apparatus 840 in accordance with a fifth embodiment of the present invention.

FIG. 21 illustrates an exemplary configuration of an image processing apparatus 840 in accordance with the fifth embodiment of the present invention.

The image processing apparatus 840 is provided with a light vector computing unit 380. Other features of the configuration are identical to those of the third embodiment of the present invention, and for this reason further description thereof is omitted for the sake of brevity.

The light vector computing unit 380 is provided with an LPF 381, a multiplier 382, and a light source direction estimator 383.

The LPF 381 applies a 9×9 tap LPF to the low-frequency normal vectors $n_{x0}$ and $n_{y0}$ supplied from the normal vector computing unit 310. Herein, both the use of low-frequency normal vectors as well as the application of an LPF are performed in order to avoid the effects of noise. The LPF 381 subsequently supplies the LPF-processed, low-frequency normal vectors to the multiplier 382.

The multiplier 382 multiplies the LPF-processed, low-frequency normal vectors supplied from the LPF 381 by the shadow addition control signal $\alpha_i$ supplied from the control signal synthesis arithmetic unit 431, thereby computing normal vectors $n_e$ (to be hereinafter described) for estimating the direction of the light source (cf. Eq. 54). Herein, the LPF-processed, low-frequency normal vectors are multiplied by the shadow addition control signal $\alpha_i$ in order to eliminate both flat regions of low contrast as well as edge rims from the normal vectors $n_e$ for estimating the direction of the light source. The multiplier 382 subsequently supplies the computed normal vectors $n_e$ to the light source direction estimator 383.

$$\vec{n}_e = \alpha_i \times \text{LPF}(\vec{n}_0) \quad (54)$$

The light source direction estimator 383 sets a single light source direction for the entire image. First, the light source direction estimator 383 creates in advance light vectors $l_e$ for estimating the direction of the light source. Herein, two sets of light vectors are created, respectively having azimuthal angles θ of (π/4) and (3π/4), as shown in FIG. 22 (to be hereinafter described).

Next, the light source direction estimator 383 applies Eq. 25 to compute the shadow contrast between the normal vectors $n_e$ and the light vectors $l_e$ (cf. Eq. 55).

$$C_P(\theta) = \quad (55)$$

$$\nabla \left| \vec{n}_e \cdot \vec{l}_e(\theta) \right| = \sqrt{\left( \frac{d \vec{n}_e \cdot \vec{l}_e(\theta)}{dx} \right)^2 + \left( \frac{d \vec{n}_e \cdot \vec{l}_e(\theta)}{dy} \right)^2}$$

Subsequently, the light source direction estimator 383 detects, for each pixel, whether the shadow contrast reaches a larger value for an azimuthal angle θ of (π/4) or (3π/4), and then increments the pixel count of one of the counters cntL and cntR that correspond to the two values of θ. At this point, an offset value defining an intermediate region is prepared in order to eliminate from consideration the pixel regions wherein the difference between the computed contrast values is insignificant (and thus wherein the light source may be incident from either angle). Consequently, a count is registered only when the difference between the computed contrast values exceeds the offset (cf. Eqs. 56 and 57).

$$C_P\left(\frac{\pi}{4}\right) + \text{offset} < C_P\left(\frac{3\pi}{4}\right) \quad (56)$$
$$\text{cnt}L{+} = 1$$

$$C_P\left(\frac{\pi}{4}\right) > C_P\left(\frac{3\pi}{4}\right) + \text{offset} \quad (57)$$
$$\text{cnt}R{+} = 1$$

Next, the light source direction estimator 383 uses Eq. 58 to compute a ratio between cntL and cntR. Herein, the evaluation value ratioR indicates that the degree of shadow contrast increases when the entire image is subject to light vectors incident from an angle of (π/4).

$$\text{ratio}R = \frac{\text{cnt}R}{\text{cnt}L + \text{cnt}R} \quad (58)$$

From the evaluation value ratioR, the light source direction estimator 383 computes final light vectors for the entire image using the determining method shown in FIG. 23, to be hereinafter described. The light source direction estimator 383 subsequently supplies the computed light vectors to the normalized inner product arithmetic unit 331.

Figure 22A:
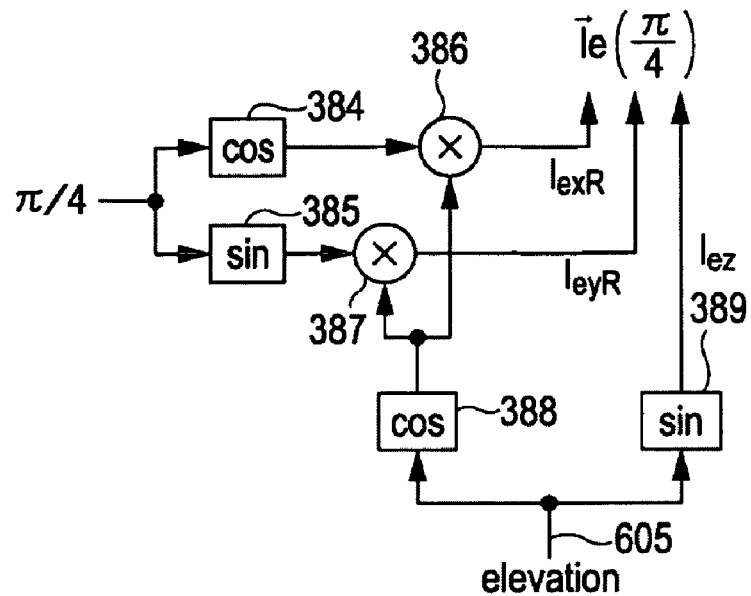
FIG. 22A is a diagram illustrating a method for computing light vector candidates used by a light source direction estimator 383 in accordance with a fifth embodiment of the present invention.
Figure 22B:
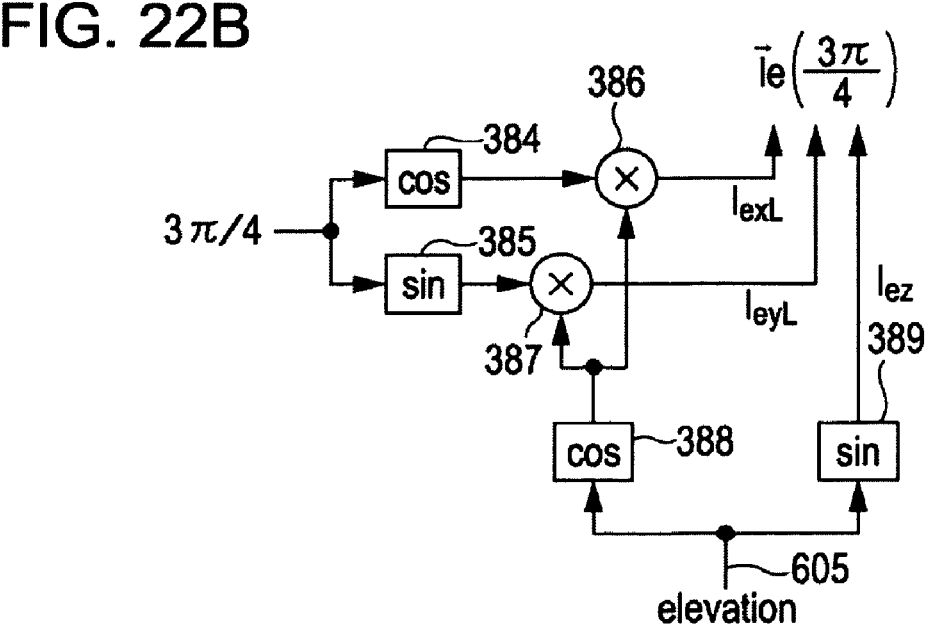
FIG. 22B is a diagram illustrating a method for computing light vector candidates used by a light source direction estimator 383 in accordance with a fifth embodiment of the present invention.

FIGS. 22A and 22B are diagrams illustrating the method for computing exemplary light vector candidates used by the light source direction estimator 383 in accordance with the fifth embodiment of the present invention. FIG. 22A illustrates the case wherein the light vectors $l_e$ for estimating the direction of the light source are computed using an azimuthal angle θ of (π/4). FIG. 22B illustrates the case wherein the light vectors $l_e$ for estimating the direction of the light source are computed using an azimuthal angle θ of (π/4). The light source direction estimator 383 is provided with cosine operators 384 and 388, sine operators 385 and 389, and multipliers 386 and 387.

In FIG. 22A, the azimuthal angle (π/4) is supplied to the cosine operator 384 and the sine operator 385. The multiplier 386 then multiplies the cosine of (π/4) (having been computed by the cosine operator 384) by the cosine of the elevation angle φ (having been computed by the cosine operator 388), thereby computing the x components $L_{exR}$ of the light vectors $l_e$ for an azimuthal angle θ of (π/4). The multiplier 387 multiplies the sine of (π/4) (having been computed by the sine operator 385) by the cosine of the elevation angle φ (having been computed by the cosine operator 388), thereby computing the y components $L_{eyR}$ of the light vectors $l_e$ for an azimuthal angle θ of (π/4). The sine operator 389 computes the sine of the elevation angle φ, thereby computing the z components $L_{exR}$ of the light vectors $l_e$ for an azimuthal angle θ of (π/4).

In FIG. 22B, the azimuthal angle (3π/4) is supplied to the cosine operator 384 and the sine operator 385. The multiplier 386 then multiplies the cosine of (3π/4) (having been computed by the cosine operator 384) by the cosine of the elevation angle θ (having been computed by the cosine operator 388), thereby computing the x components $L_{exL}$ of the light vectors $l_e$ for an azimuthal angle θ of (3π/4). The multiplier 387 multiplies the sine of (3π/4) (having been computed by the sine operator 385) by the cosine of the elevation angle φ (having been computed by the cosine operator 388), thereby computing the y components $L_{eyL}$ of the light vectors $l_e$ for an azimuthal angle θ of (3π/4). The sine operator 389 computes the sine of the elevation angle φ, thereby computing the z components $L_{ezL}$ of the light vectors $l_e$ for an azimuthal angle θ of (3π/4).

It should be appreciated that if the elevation angle φ is a fixed value, then the light vectors $l_e$ for estimating the direction of the light source also become fixed values. In this case, the light source direction estimator 383 may simply record the final results of the above.

Figure 23:
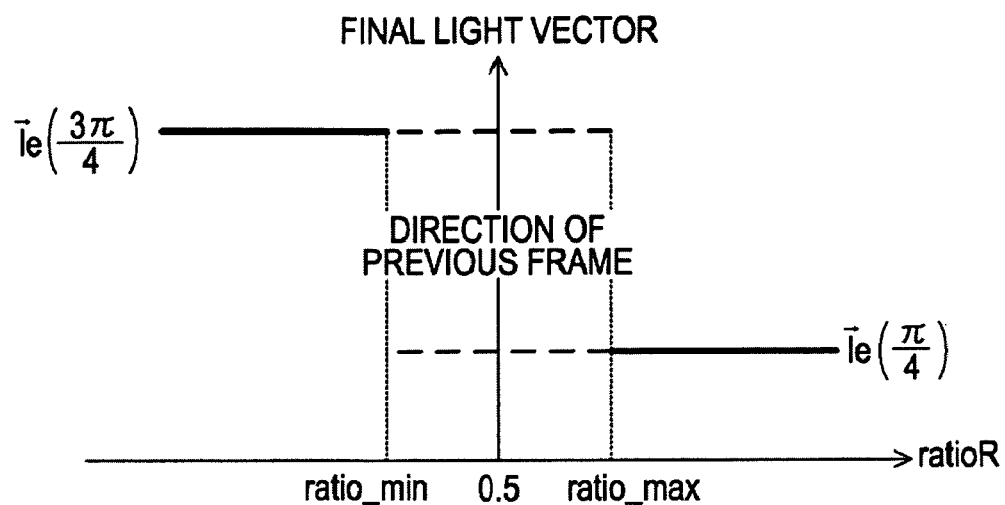
FIG. 23 is a diagram explaining a light vector determining method used by a light source direction estimator 383 in accordance with a fifth embodiment of the present invention.

FIG. 23 is a diagram illustrating the method for determining light vectors that is conducted by the light source direction estimator 383 in accordance with the fifth embodiment of the present invention. In FIG. 23, the horizontal axis represents the evaluation value ratioR, while the vertical axis represents the final light vectors.

Herein, the final light vectors are determined using the value of the above evaluation value ratioR. More specifically, if the evaluation value ratioR is greater than a threshold value ratio_max, then the light vectors computed for an azimuthal angle θ of (π/4) are used as the final light vectors. If the evaluation value ratioR is less than a threshold value ratio_min, then the light vectors computed for an azimuthal angle θ of (3π/4) are used as the final light vectors. In all other cases, the results from the previous frame are used.

In this way, according to a fifth embodiment of the present invention, advantages similar to those of the first embodiment of the present invention are obtained. Moreover, since a single light source direction is used for the entire image, the computational load involved in computing the direction of the light source is reduced.

A sixth embodiment of the present invention will now be described in detail.

An image processing apparatus in accordance with the sixth embodiment of the present invention is provided with another light source direction estimator 390 different from the light source direction estimator 383 provided in the image processing apparatus in accordance with the fifth embodiment of the present invention shown in FIG. 21. Other features of the configuration are identical to those of the fifth embodiment of the present invention, and for this reason further description thereof is omitted for the sake of brevity.

The light source direction estimator 390 in accordance with the sixth embodiment of the present invention estimates the direction of the light source such that the direction of the light source is the same for all regions relatively large in size. Similarly to the fifth embodiment of the present invention, the light source direction estimator 390 first creates two sets of light vectors $l_e$ for estimating the direction of the light source, wherein the azimuthal angle θ is respectively set to (π/4) and (3π/4), as shown in FIG. 22.

Subsequently, the light source direction estimator 390 defines a proximity focus block M×N (of size 55 pixels×55 pixels, for example) for all pixels. The light source direction estimator 390 subsequently uses Eq. 59 to compute the average shadow contrast within the focus block for the two values of the azimuthal angle θ. Herein, Ω represents the proximity size.

$$C_\Omega(\theta) = \frac{\sum_{P \in \Omega} C_P(\theta)}{M \times N} \quad (59)$$

$$\text{eval} = C_\Omega\left(\frac{\pi}{4}\right) - C_\Omega\left(\frac{3\pi}{4}\right) \quad (60)$$

$$\vec{l} = \alpha_B \vec{l}_e\left(\frac{\pi}{4}\right) + (1 - \alpha_B) \vec{l}_e\left(\frac{3\pi}{4}\right) \quad (61)$$

Figure 24:
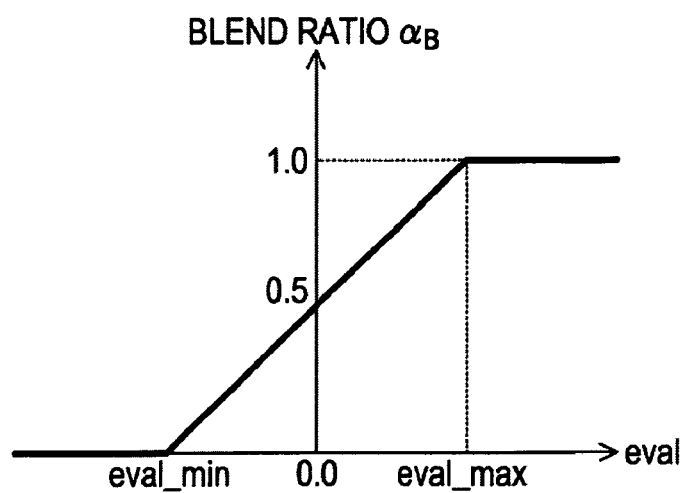
FIG. 24 is a diagram explaining a blend ratio $\alpha_B$ used by a light source direction estimator in an image processing apparatus in accordance with a sixth embodiment of the present invention.

Subsequently, the light source direction estimator 390 computes a evaluation value eval, being the difference between the two values of the average shadow contrast for all pixels within the focus block for the two values of the azimuthal angle θ (cf. Eq. 60). From this evaluation value eval, a blend ratio $\alpha_B$ is set, as shown in FIG. 24 (to be hereinafter described). As shown in Eq. 61, the computed blend ratio $\alpha_B$ is used to blend the light vectors $l_e$ (π/4) with the light vectors $l_e$ (3π/4), thereby computing a light vector l for each pixel. The light source direction estimator 390 supplies the computed light vector l to the normalized inner product arithmetic unit 331.

FIG. 24 is a diagram explaining the blend ratio $\alpha_B$ used by the light source direction estimator 390 in an image processing apparatus in accordance with the sixth embodiment of the present invention. In FIG. 24, the horizontal axis represents the evaluation value eval, while the vertical axis represents the blend ratio $\alpha_B$. The blend ratio $\alpha_B$ is defined so as to increase the proportion of the light vectors $l_e$(π/4) in the blended result as the evaluation value eval increases, while also increasing the proportion of the light vectors $l_e$(3π/4) in the blended result as the evaluation value eval decreases.

In this way, according to the sixth embodiment of the present invention, advantages similar to the first embodiment of the present invention are obtained. Moreover, image processing is controlled such that the same light source direction is used for all regions of a relatively large size.

In the foregoing embodiments of the present invention, a band separator 200 was provided, and the shadow component was calculated using per-band luminous intensity information $f_{Lj}$. However, it should be appreciated that an embodiment of the invention may also be configured without a band separator 200, wherein the shadow component is calculated using local luminous intensity information $f_L$.

In addition, in the foregoing embodiments of the present invention, a control signal generator 400 was provided, and processing was conducted using a shadow addition control signal. However, it should be appreciated that an embodiment of the invention may also be configured without a control signal generator 400.

Furthermore, the foregoing embodiments of the present invention are given as examples for realizing the present invention, and while features of the foregoing embodiments may respectively exhibit a correspondence with features of the appended claims, it should be understood that the claimed invention is not limited to the described features of the foregoing embodiments, and that various modifications may be performed without departing from the spirit and scope of the present invention.

More specifically, the luminous intensity information separating means described in the appended claims may correspond, by way of example, to the luminous intensity information separator 100. Likewise, the shadow component generating means may correspond, by way of example, to the shadow component generator 300. Likewise, the image compositing means may correspond, by way of example, to the image compositor 500.

In addition, the normal vector computing means described in the appended claims may correspond, by way of example, to the normal vector computing unit 310. Likewise, the light vector computing means may also correspond, by way of example, to the light vector computing unit 320. Likewise, the normalized inner product processing means may correspond, by way of example, to the normalized inner product processor 330.

In addition, the band separating means described in the appended claims may correspond, by way, of example, to the band separator 200.

In addition, the control signal generating means described in the appended claims may correspond, by way of example, to the control signal generator 400.

In addition, the edge rims intensity computing means may correspond, by way of example, to the edge rims intensity computing unit 410. Likewise, the gradient reliability computing means may correspond, by way of example, to the gradient reliability computing unit 420.

In addition, the sequence described in the appended claims whereby the input image information of an input image is separated into global luminous intensity information and local luminous intensity information may correspond, by way of example, to the processing performed by the luminous intensity information separator 100. Likewise, the sequence whereby the shadow component of an image is generated on the basis of local luminous intensity information may correspond, by way of example, to the processing performed by the shadow component generator 300. Likewise, the sequence whereby output image information is generated by adding shadow image information (having been generated from the shadow component and a value based on the input image information) to the input image information may correspond, by way of example, to the processing performed by the image compositor 500.

Furthermore, the processing sequences described with respect to the foregoing embodiments of the present invention may be realized as a method having a series of steps equivalent to the sequences described in the foregoing, or alternatively, as a program, or recording medium storing the same, that causes a computer to execute a series of steps equivalent to the sequences described in the foregoing.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
luminous intensity information separating means for separating input image information from an input image into global luminous intensity information and local luminous intensity information;
shadow component generating means for generating a shadow component of the input image on the basis of the local luminous intensity information;
image compositing means for generating output image information by adding shadow image information to the input image information, with the shadow image information being generated from the shadow component and from a value based on the input image information;
normal vector computing means for computing a luminous intensity gradient of the local luminous intensity information as a normal vector with respect to an object surface in the input image,
light vector computing means for computing, on the basis of the local luminous intensity information, a light vector that indicates the direction of a light source, and
normalized inner product processing means for computing the shadow component on the basis of the normalized inner product between the normal vector and the light vector.

2. The image processing apparatus according to claim 1, further comprising:
band separating means for generating a plurality of local, per-band luminous intensity information by band-separating the local luminous intensity information; wherein the shadow component generating means generates the shadow component on the basis of the per-band luminous intensity information.

3. The image processing apparatus according to claim 1, further comprising:
control signal generating means for generating, on the basis of the input image information, a shadow addition control signal for controlling the intensity of the shadow component; wherein the image compositing means additionally uses the shadow addition control signal when generating the shadow image information.

4. The image processing apparatus according to claim 3, wherein the control signal generating means includes
edge rims intensity computing means for generating, on the basis of the input image information, an edge rims intensity value for use in conducting a control to suppress the intensity of edges rims in the shadow component, and
gradient reliability computing means for computing, on the basis of the input image information, a gradient reliability value for use in conducting a control to suppress the intensity of portions of low contrast in the shadow component.

5. The image processing apparatus according to claim 3, wherein the image compositing means generates the shadow image information from the shadow component, from a value based on the global luminous intensity information, and from the shadow addition control signal.

6. The image processing apparatus according to claim 3, wherein the image compositing means combines information using a predetermined value, such that the combining is conducted when a value based on the input image information is greater than the predetermined value.

7. The image processing apparatus according to claim 3, wherein the image compositing means combines information using a predetermined value, such that the combining is conducted when the value of the shadow image information is less than the predetermined value.

8. The image processing apparatus according to claim 1, wherein the light vector computing means computes, on the basis of the local luminous intensity information, the direction of maximum luminous intensity gradient in the vicinity of a focus pixel, and then computes a light vector with respect to the focus pixel by subjecting the direction of maximum luminous intensity gradient to angle conversion.

9. The image processing apparatus according to claim 1, wherein the light vector computing means computes, on the basis of the local luminous intensity information, the direction of maximum luminous intensity gradient in the vicinity of a focus pixel, and then computes a light vector with respect to the focus pixel by subjecting the direction of maximum luminous intensity gradient to vector conversion.

10. The image processing apparatus according to claim 1, wherein the light vector computing means computes a light vector with respect to a focus pixel by subjecting an azimuthal angle of the normal vector to angle conversion.

11. The image processing apparatus according to claim 1, wherein the light vector computing means computes a light vector with respect to a focus pixel by subjecting an azimuthal component of the normal vector to vector conversion.

12. The image processing apparatus according to claim 1, wherein the light vector computing means computes, on the basis of a plurality of light vector candidates and the normal vector, a contrast candidate value for the shadow component with respect to each pixel in the input image, and then selects a light vector from among the plurality of light vector candidates whereby the largest number of pixels obtains the maximum contrast candidate value, with the selected light vector subsequently being taken to be a common light vector for all pixels.

13. The image processing apparatus according to claim 1, wherein the light vector computing means takes a plurality of light vector candidates, computes an average contrast candidate value for the shadow component within a specified area in the vicinity of a focus pixel with respect to each light vector candidate, and then combines the plurality of light vector candidates on the basis of the ratio of the average values to thereby compute the light vector with respect to the focus pixel.

14. The image processing apparatus according to claim 1, wherein the luminous intensity information separating means is configured such that
the local luminous intensity information is taken to be information wherein the difference between the input information and a signal of the input information that has passed through a low-pass filter (i.e., the high-frequency components of the input image information) has been suppressed, and
the global luminous intensity information is taken to be the differences between the input image information and the local luminous intensity information.

15. The image processing apparatus according to claim 1, wherein the luminous intensity information separating means includes a plurality of low-pass filters having different passbands, and is configured such that the local luminous intensity information is generated by first obtaining a plurality of low-frequency components whose respective high-frequency components (i.e., the components resulting from the respective differences between the input image information and one among the plurality of signals of the input image information that has passed through one among the plurality of low-pass filters) have been suppressed, and then mixing the plurality of low-frequency components to form the local luminous intensity information, and the global luminous intensity information is taken to be the difference between the input image information and the local luminous intensity information.

16. An image processing apparatus, comprising:

luminous intensity information separating means for separating input image information from an input image into global luminous intensity information and local luminous intensity information;

band separating means for generating a plurality of local, per-band luminous intensity information by band-separating the local luminous intensity information;

shadow component generating means for generating a shadow component of the image on the basis of the plurality of local, per-band luminous intensity information;

control signal generating means for generating, on the basis of the input image information, a shadow addition control signal for controlling portions where the shadow component is to be suppressed; and image compositing means for generating output image information by adding shadow image information to the input image information, with the shadow image information being generated from the shadow component, from a value based on the input image information, and from the shadow addition control signal;

normal vector computing means for computing a luminous intensity gradient of the local luminous intensity information as a normal vector with respect to an object surface in the input image, light vector computing means for computing, on the basis of the local luminous intensity information, a light vector that indicates the direction of a light source, and normalized inner product processing means for computing the shadow component on the basis of the normalized inner product between the normal vector and the light vector.

17. An image processing method implemented on at least one processor, the method comprising the steps of:

separating input image information from an input image into global luminous intensity information and local luminous intensity information;

computing a luminous intensity gradient of the local luminous intensity information as a normal vector with respect to an object surface in the input image;

computing, on the basis of the local luminous intensity information, a light vector that indicates the direction of a light source;

computing a shadow component on the basis of the normalized inner product between the normal vector and the light vector; and generating output image information by adding shadow image information to the input image information, with the shadow image information being generated from the shadow component and from a value based on the input image information.

18. A nontransitory computer-readable medium storing a program that causes a computer to execute the steps of:

separating input image information from an input image into global luminous intensity information and local luminous intensity information;

computing a luminous intensity gradient of the local luminous intensity information as a normal vector with respect to an object surface in the input image;

computing, on the basis of the local luminous intensity information, a light vector that indicates the direction of a light source;

computing a shadow component on the basis of the normalized inner product between the normal vector and the light vector; and generating output image information by adding shadow image information to the input image information, with the shadow image information being generated from the shadow component and from a value based on the input image information.

19. An image processing apparatus, comprising:

a luminous intensity information separator configured to separate input image information from an input image into global luminous intensity information and local luminous intensity information;

a shadow component generator configured to generate a shadow component of the image on the basis of the local luminous intensity information; and an image compositor configured to generate output image information by adding shadow image information to the input image information, with the shadow image, information being generated from the shadow component and from a value based on the input image information;

a normal vector computer configured to compute a luminous intensity gradient of the local luminous intensity information as a normal vector with respect to an object surface in the input image, a light vector computer configured to compute, on the basis of the local luminous intensity information, a light vector that indicates the direction of a light source, and a normalized inner product processor configured to compute the shadow component on the basis of the normalized inner product between the normal vector and the light vector.

20. An image processing apparatus, comprising:

a luminous intensity information separator configured to separate input image information from an input image into global luminous intensity information and local luminous intensity information;

a band separator configured to generate a plurality of local, per-band luminous intensity information by band-separating the local luminous intensity information;

a shadow component generator configured to generate a shadow component of the image on the basis of the plurality of local, per-band luminous intensity information;

a control signal generator configured to generate, on the basis of the input image information, a shadow addition control signal for controlling portions where the shadow component is to be suppressed;

an image compositor configured to generate output image information by adding shadow image information to the input image information, with the shadow image information being generated from the shadow component, from a value based on the input image information, and from the shadow addition control signal;

a normal vector computer configured to compute a luminous intensity gradient of the local luminous intensity information as a normal vector with respect to an object surface in the input image, a light vector computer configured to compute, on the basis of the local luminous intensity information, a light vector that indicates the direction of a light source, and a normalized inner product processor configured to compute the shadow component on the basis of the normalized inner product between the normal vector and the light vector.

* * * * *